(12) United States Patent
Fujita

(10) Patent No.: US 10,359,293 B2
(45) Date of Patent: Jul. 23, 2019

(54) TRAVEL ROUTE CALCULATION DEVICE

(71) Applicant: Nissan Motor Co., Ltd., Yokohama-shi, Kanagawa (JP)

(72) Inventor: Susumu Fujita, Kanagawa (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 15/520,334

(22) PCT Filed: Oct. 22, 2014

(86) PCT No.: PCT/JP2014/078125
§ 371 (c)(1),
(2) Date: Apr. 19, 2017

(87) PCT Pub. No.: WO2016/063385
PCT Pub. Date: Apr. 28, 2016

(65) Prior Publication Data
US 2017/0314943 A1     Nov. 2, 2017

(51) Int. Cl.
*G01C 21/34* (2006.01)
*G08G 1/0968* (2006.01)

(52) U.S. Cl.
CPC ......... *G01C 21/3415* (2013.01); *G01C 21/34* (2013.01); *G01C 21/3407* (2013.01); *G01C 21/3461* (2013.01); *G08G 1/096827* (2013.01)

(58) Field of Classification Search
CPC ............................ G01C 21/34; G01C 21/3407; G01C 21/3461; G08G 1/096827
USPC ....................................................... 701/411
See application file for complete search history.

(56) References Cited

U.S. PATENT DOCUMENTS

2011/0190972 A1* 8/2011 Timmons ............... G01C 21/34
                                                                    701/31.4
2014/0244151 A1   8/2014 Matsubara et al.

FOREIGN PATENT DOCUMENTS

| JP | 2008157820  | A | 7/2008 |
| JP | 2012247315  | * | 12/2012 |
| JP | 2012247315 A |   | 12/2012 |
| JP | 2013083498  | * | 5/2013 |
| JP | 2013083498 A |   | 5/2013 |

* cited by examiner

*Primary Examiner* — Maceeh Anwari
(74) *Attorney, Agent, or Firm* — Young Basile Hanlon & MacFarlane, P.C.

(57) ABSTRACT

The travel route calculation device includes a travel route calculation unit configured to calculate a travel route for a subject vehicle to arrive at a destination, an information acquisition unit configured to acquire information on an object, which affects recognition of a feature by the subject vehicle, as object information, and a distance measurement unit configured to measure a distance from the subject vehicle to the feature as a necessary recognition distance. The necessary recognition distance is necessary for the subject vehicle to recognize the feature when deciding an action. The travel route calculation device further includes a determination unit configured to determine difficulty in recognizing the feature, on the basis of the object information and the necessary recognition distance. The travel route calculation unit calculates the travel route while avoiding a location at which recognition of the feature is determined to be difficult by the determination unit.

14 Claims, 15 Drawing Sheets

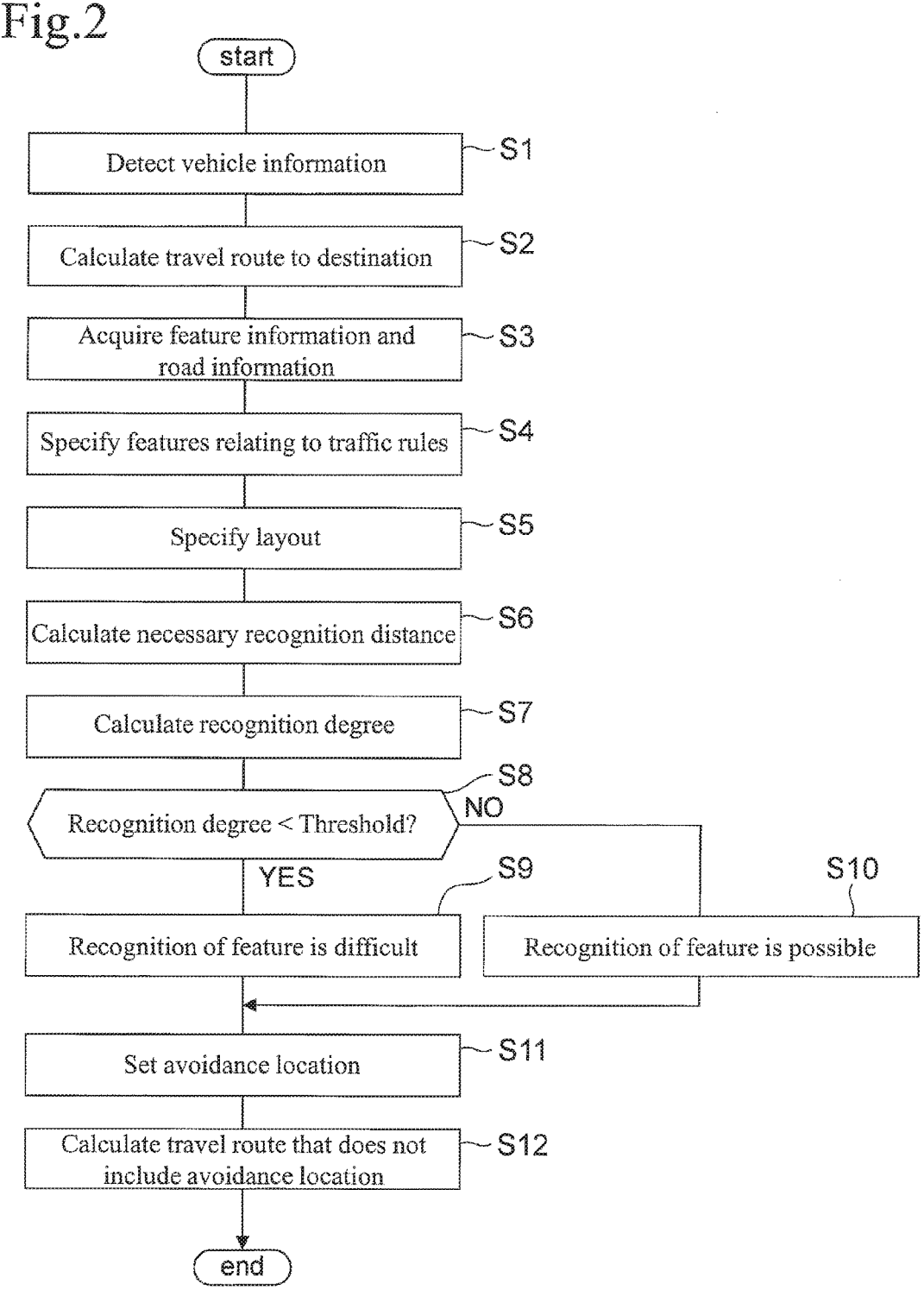

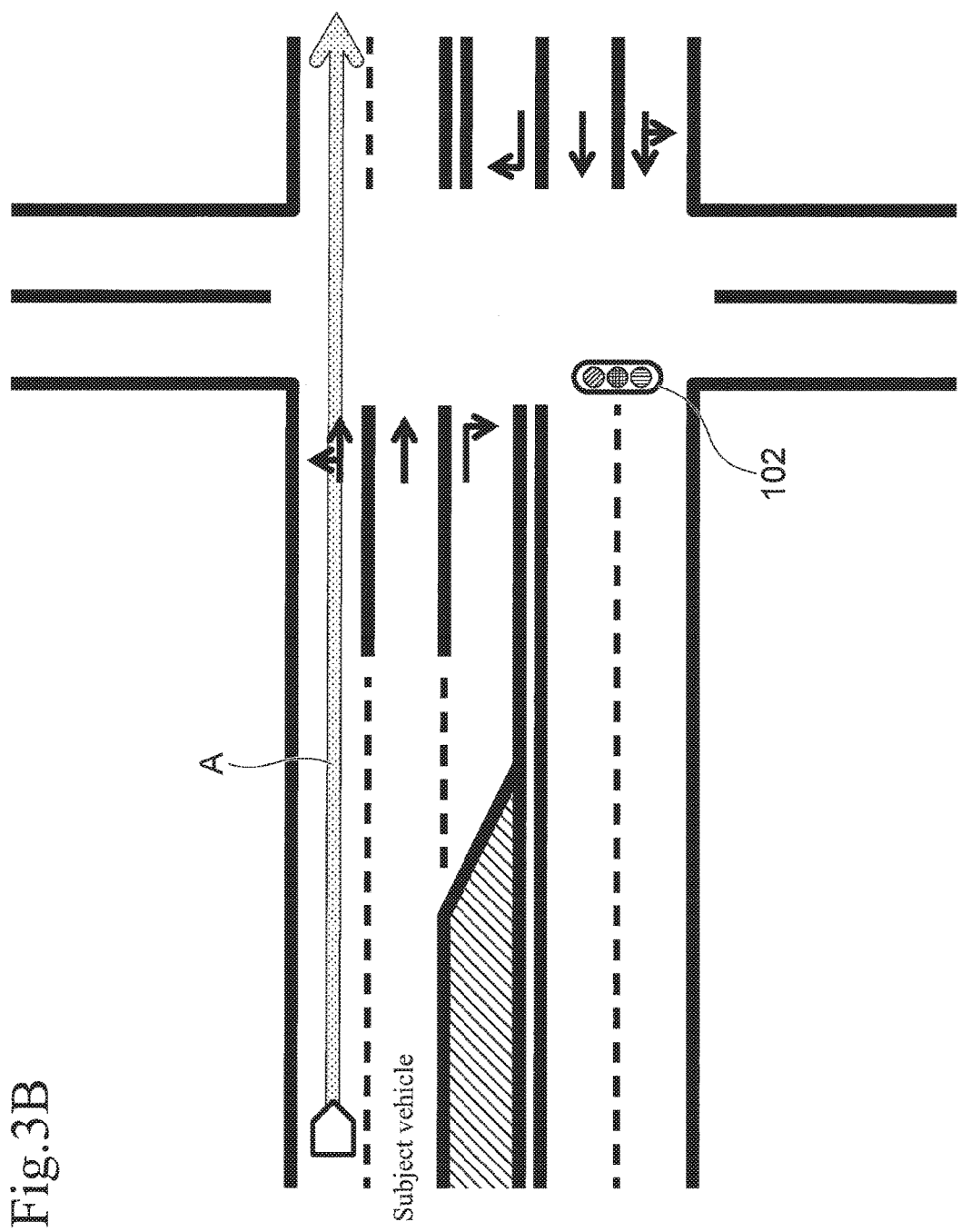

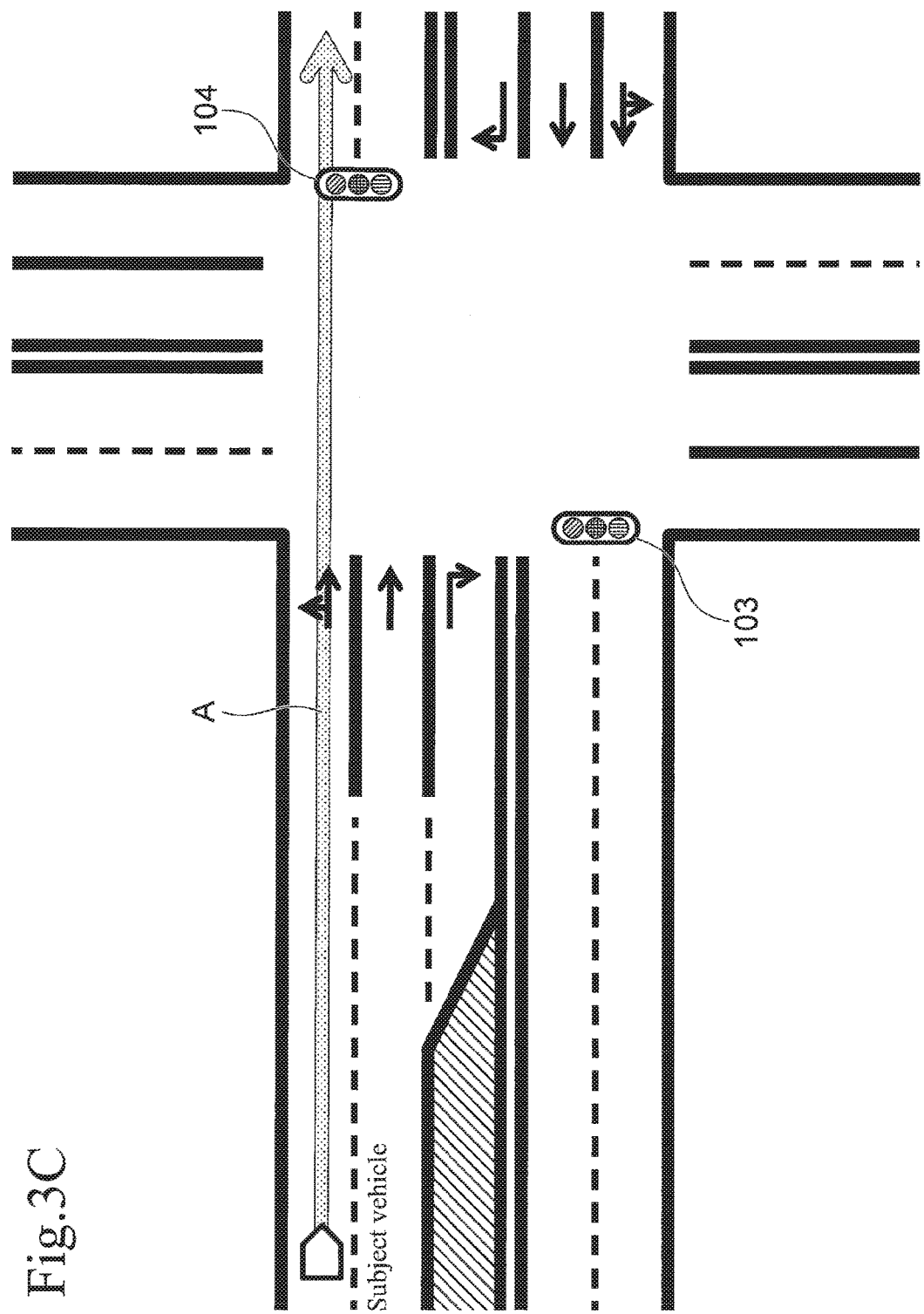

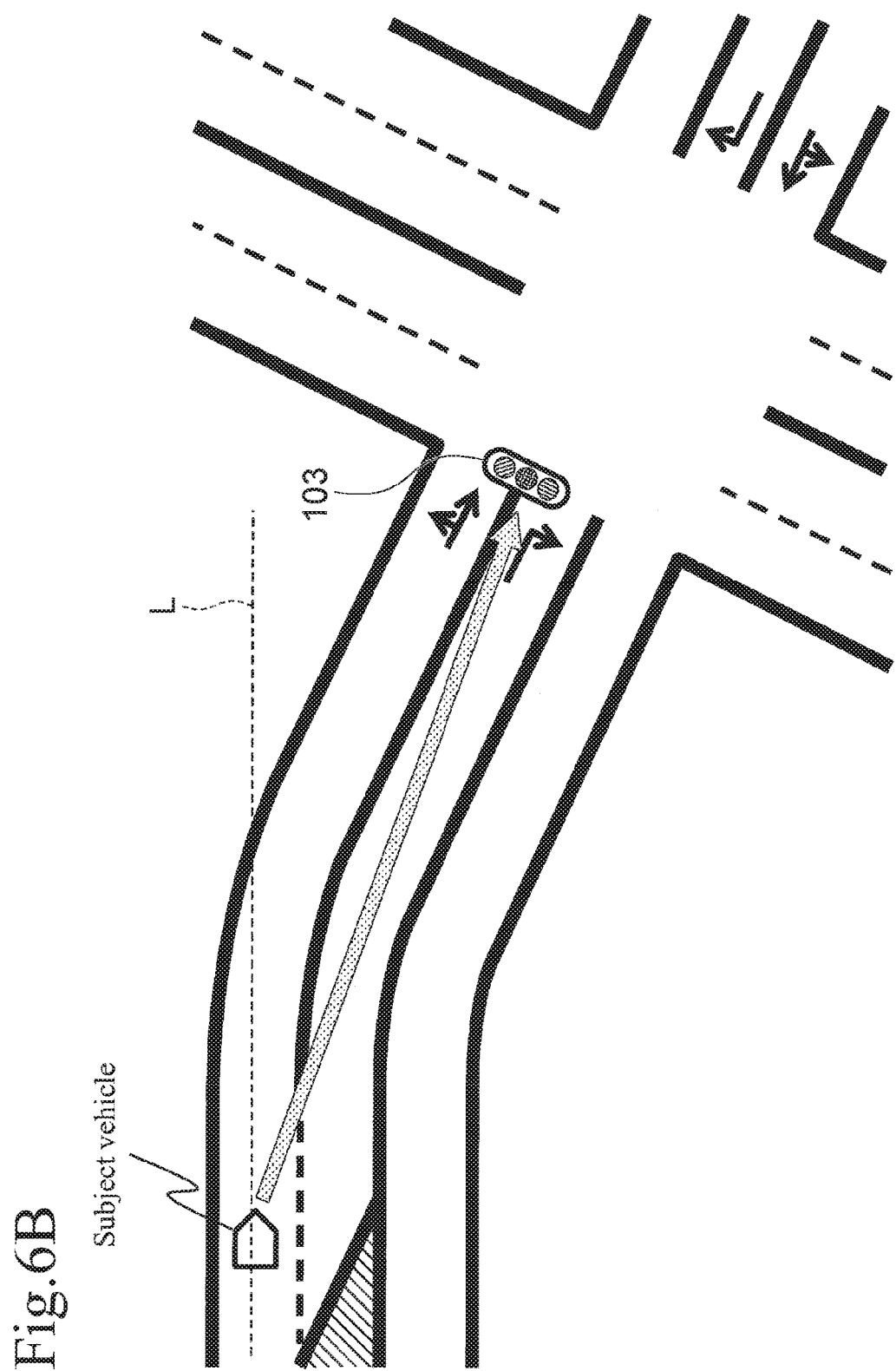

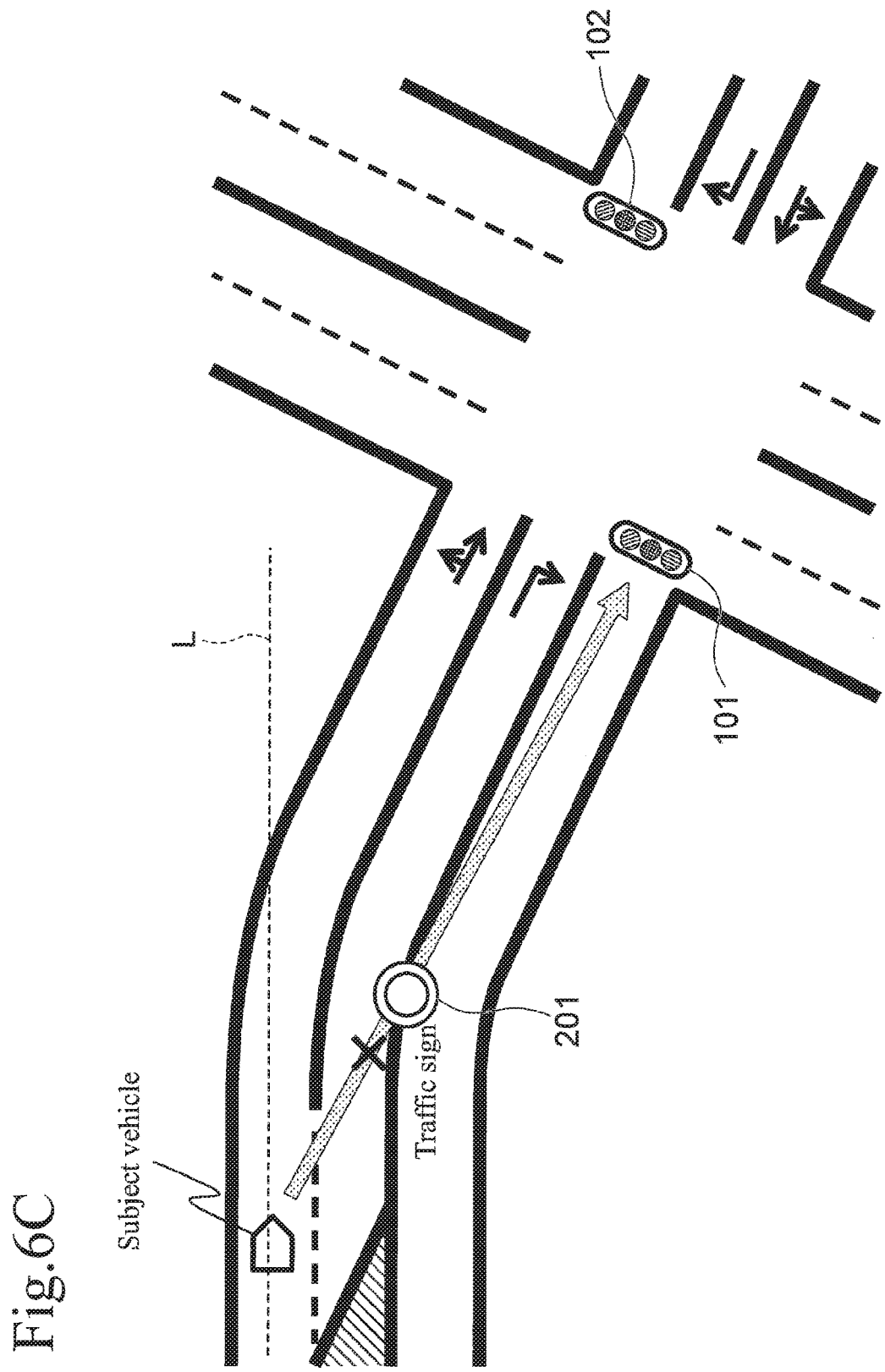

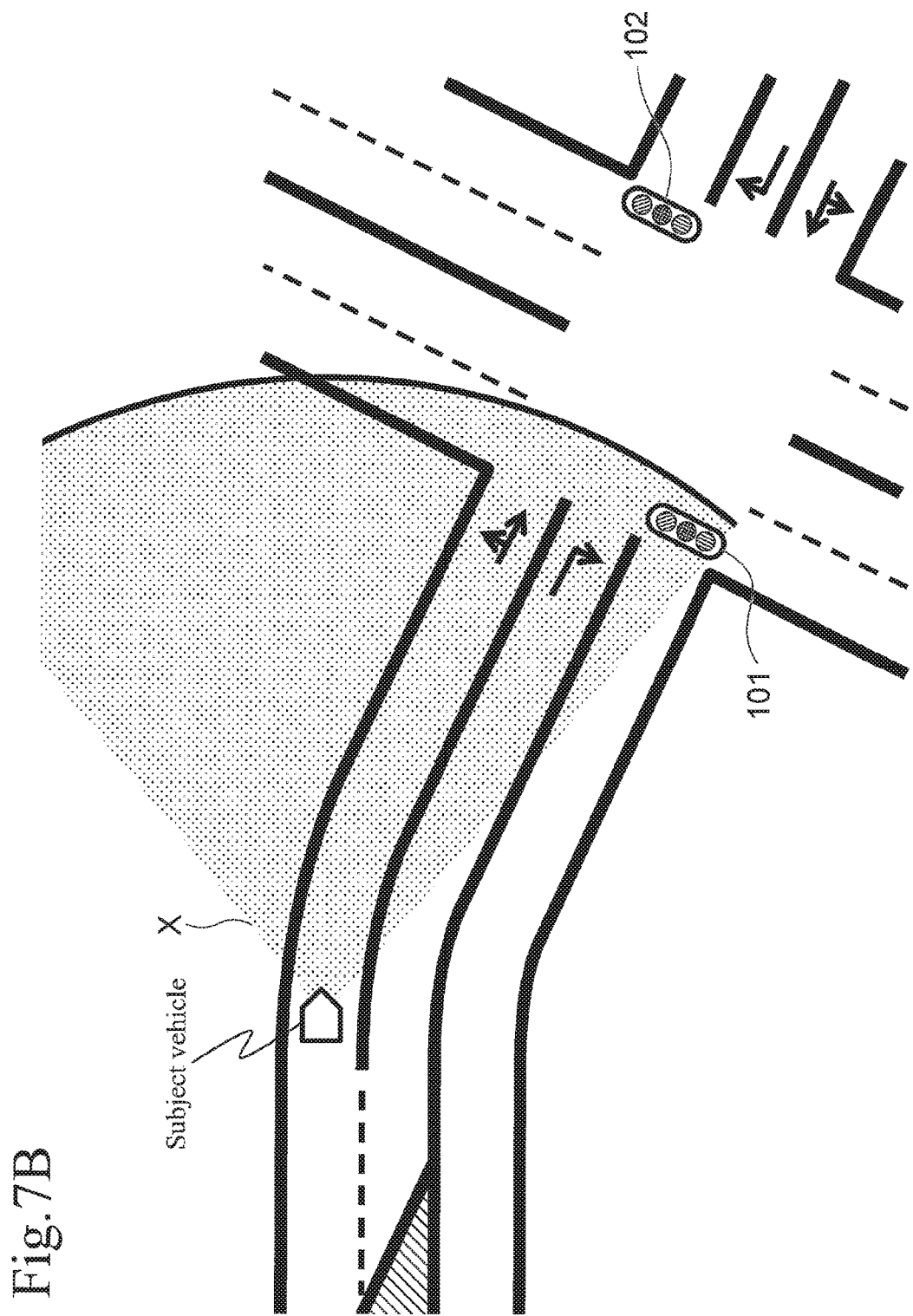

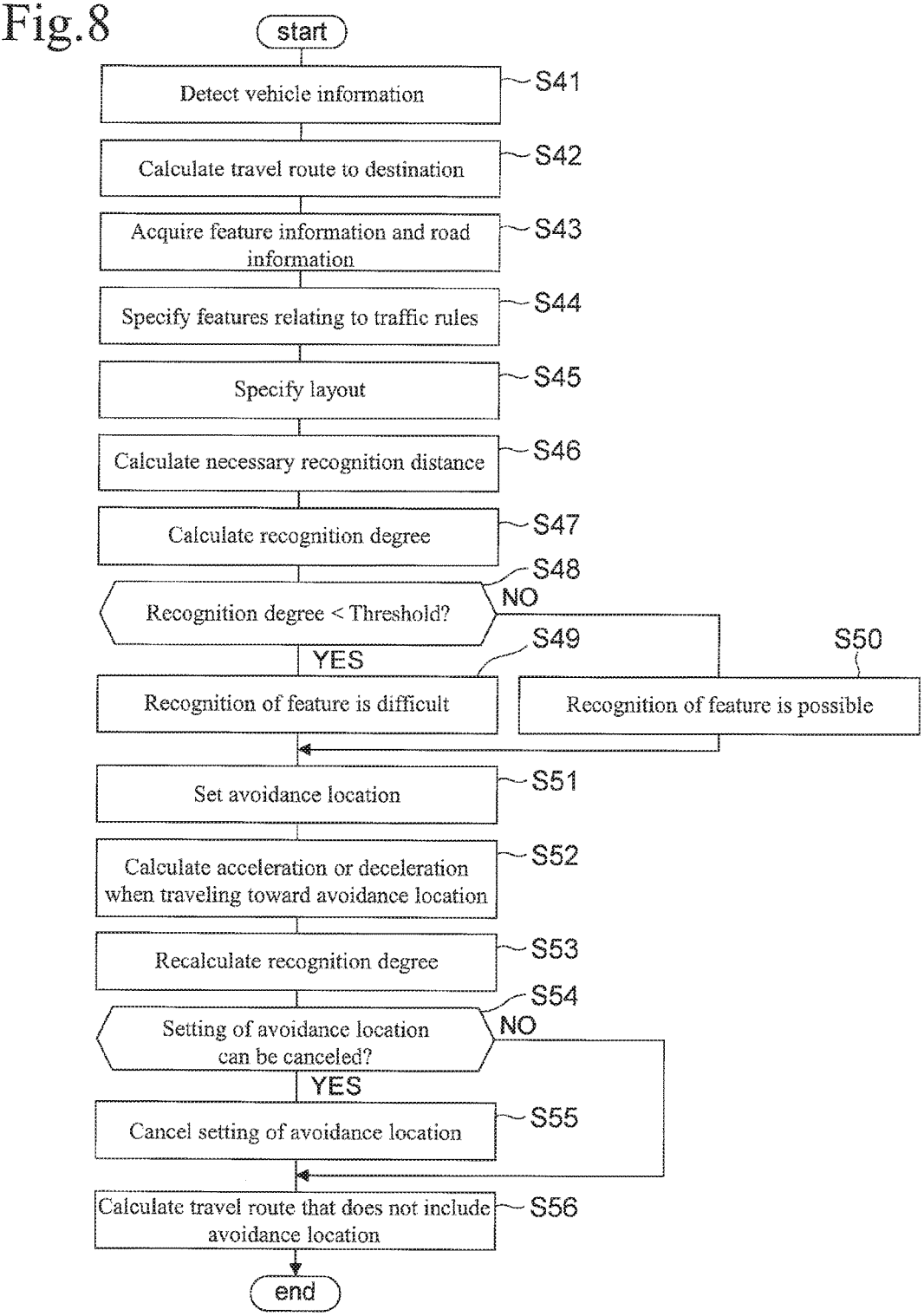

TRAVEL ROUTE CALCULATION DEVICE

TECHNICAL FIELD

The present invention relates to a travel route calculation device that calculates a travel route.

BACKGROUND

Route guidance devices are heretofore known which are configured to guide a route to a designated destination while being reflected with an isolated intersection at which there is the risk for a vehicle to be isolated without smoothly passing through the intersection. For example, JP2012-247315A discloses a route guidance device in which a risk value matrix is prepared for each factor feature, such as a railroad crossing and a lane decreased portion of a road, which exists in the leaving direction from an intersection. The risk value matrix gives a risk value score that indicates the possibility that the intersection can be an isolated intersection. For a search result of the route from a starting point to a destination, the route guidance device refers to the risk value matrix for each intersection on that route to obtain the risk value score and extracts, as the isolated intersection, an intersection at which the risk value score exceeds a predetermined threshold. Then, the route guidance device searches and guides a route that allows avoidance of the isolated intersection.

Drive assist vehicles or autonomous drive vehicles perform an action decision of the vehicle and travel while recognizing traffic signals and the like. In such vehicles performing the action decision, information necessary for the action decision has to be collected for an appropriate drive.

In the above technique of JP2012-247315A, however, the index of the degree of risk is based on whether there is the risk for a vehicle to be isolated at an intersection. Thus, even when the degree of risk is low at an intersection, the vehicle deciding the action cannot recognize traffic signals and the like due to factors, such as the road shape of the intersection and the positions of the traffic signals, and cannot appropriately travel.

SUMMARY

A problem to be solved by the present invention is to provide a travel route calculation device that can calculate a travel route on which features are readily perceived, for a vehicle traveling in accordance with an action decision.

The present invention solves the above problem through acquiring information on an object, which affects recognition of a feature by a subject vehicle, as object information, measuring a necessary recognition distance, which is necessary for recognition of the feature, from the subject vehicle to the feature, determining difficulty in recognizing the feature, on the basis of the object information and the necessary recognition distance, and calculating a travel route while avoiding a location at which recognition of the feature is determined to be difficult.

According to the present invention, the difficulty in recognizing a feature necessary for deciding an action is perceived on the travel route for the vehicle to arrive at a destination and it is therefore possible to calculate a travel route that allows the vehicle to readily recognize the feature.

DETAILED DESCRIPTION OF THE DRAWINGS

FIG. 2 is a flowchart illustrating a control flow of a travel route calculation device;

FIG. 3B is a view illustrating an example of the layout of a road;

FIG. 3C is a view illustrating an example of the layout of a road;

FIG. 6B is a view illustrating an example of the layout of a road;

FIG. 6C is a view illustrating an example of the layout of a road;

FIG. 7B is a view illustrating an example of the layout of a road;

FIG. 8 is a flowchart illustrating a control flow of a travel route calculation device according to still another embodiment of the present invention;

DETAILED DESCRIPTION OF THE EMBODIMENTS

Hereinafter, embodiments of the present invention will be described with reference to the drawings.

First Embodiment

Figure 1:
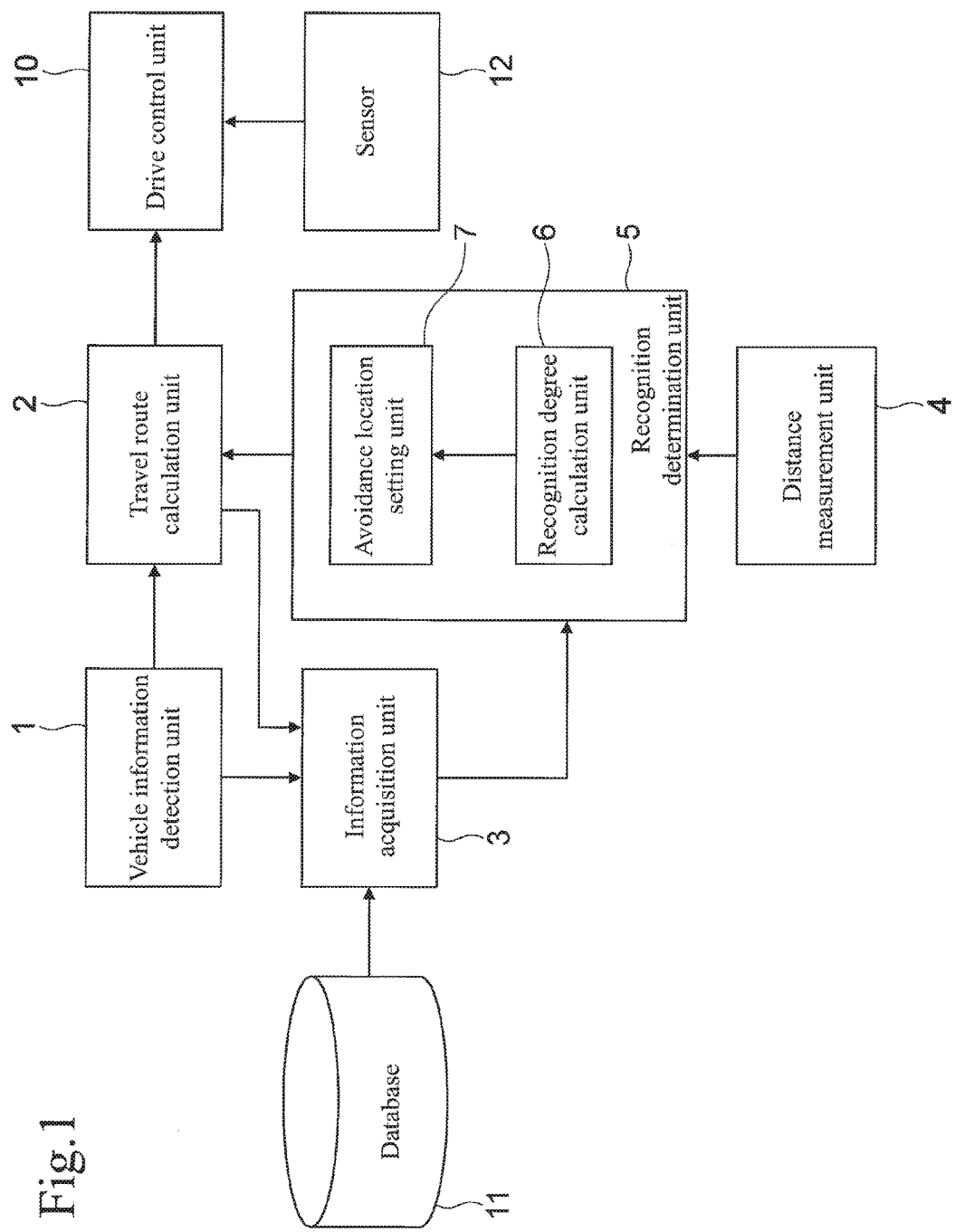
FIG. 1 is a block diagram of a travel route calculation device according to an embodiment of the present invention.

FIG. 1 is a block diagram of a travel route calculation device according to an embodiment of the present invention. The travel route calculation device according to the present embodiment is a device that is equipped in a vehicle to calculate a travel route when the vehicle performs autonomous drive.

The travel route calculation device comprises a read only memory (ROM) that stores various programs, a central processing unit (CPU) as an operation circuit that executes the programs stored in the ROM, and a random access memory (RAM) that functions as an accessible storage device.

The travel route calculation device comprises a drive control unit 10, a database 11, and a sensor 12. The database 11 stores map data, information on features, information on roads, etc. The map data includes link data and node data. The information on features includes, for example, information on traffic signals, information on railroad crossings, and information on traffic signs. The information on road shapes includes information on intersections, information on road-merging sections, and road-shape information of road-branching sections. The sensor 12 is an imaging device for detecting situations around a subject vehicle. Examples of the device used to detect situations around the subject vehicle include not only cameras but also millimeter-wave devices and radars.

The drive control unit 10 controls the autonomous drive of the subject vehicle on the basis of the captured images of a camera included in the sensor 12 and detection values of radar or the like which is not illustrated. The drive control unit 10 uses the sensor 12 and the like to recognize features necessary for deciding an action of the subject vehicle. The action decision during the autonomous drive is performed by the vehicle recognizing features, such as traffic signals, traffic signs and railroad crossings, on the travel route. The drive control unit 10 specifies a target point for performing an action of the subject vehicle, on the basis of the features. For example, when the vehicle turns right as a result of the action decision, the target point is the location of an intersection at which the vehicle turns right. Then, the drive control unit 10 performs the decided action at the target point. This allows the subject vehicle to autonomously travel.

As an example, an autonomous drive will be described, in which the subject vehicle is to travel through an intersection located ahead of the subject vehicle. Assume that the feature is a traffic signal provided at the intersection and the action of the subject vehicle in accordance with the indication of the traffic signal is the behavior of the vehicle. When the traffic signal is red or yellow, the action of the subject vehicle is an operation to stop the vehicle at a stop line of the intersection. When, on the other hand, the traffic signal is green, the action of the subject vehicle is an operation to pass through the intersection at a given speed. Thus, the traffic signal and the intersection are features that cause change in the behavior of the subject vehicle. The drive control unit 10 sets a target point for deciding the action, to the intersection. Before the vehicle enters the intersection, the drive control unit 10 recognizes the traffic signal at a location separate from the intersection by a predetermined distance. The traffic signal is detected from the captured images by a camera. Then, as the vehicle approaches the intersection, the drive control unit 10 recognizes the traffic signal and decides an action in accordance with the color indicated by the traffic signal. Then, the drive control unit 10 makes the vehicle travel in accordance with the decided action. This allows the autonomous drive of the vehicle. The drive control unit 10 performs autonomous drive control as the above in a repetitive manner during the travel on the travel route. Note that the above control of autonomous drive is merely an example and another control method may also be employed.

The travel route calculation device has a vehicle information detection unit 1, a travel route calculation unit 2, an information acquisition unit 3, a distance measurement unit 4, and a recognition determination unit 5 as functional blocks for calculating a travel route suitable for autonomous drive when performing the autonomous drive of a vehicle as the above. The recognition determination unit 5 has a recognition degree calculation unit 6 and an avoidance location setting unit 7.

The vehicle information detection unit 1 detects vehicle information of the subject vehicle. The vehicle information includes positional information of the subject vehicle and other items. The vehicle information detection unit 1 has a function to be used with GPS or the like.

The travel route calculation unit 2 acquires the vehicle information from the vehicle information detection unit 1 and calculates a travel route from the current position of the vehicle to a destination while referring to the map data. The destination is input, for example, by a user. The map data is stored in the database 11. This allows the travel route calculation unit 2 to calculate the travel route on the basis of the vehicle information.

When an avoidance location is set by the avoidance location setting unit 7, the travel route calculation unit 2 calculates the travel route so as to avoid the avoidance location.

The information acquisition unit 3 acquires a travel route from the travel route calculation unit 2. The information acquisition unit 3 also acquires, from the database 11, information on objects that affect recognition of features by the subject vehicle on the travel route. Information on objects (referred also to as "object information," hereinafter) is information for specifying difficulty when the subject vehicle recognizes features, that is, for example, information on road shapes or information on features. Information on objects may be information on features themselves or may also be information on features or roads, etc. that exist around features and are relevant when the subject vehicle recognizes the features. Information on road shapes is information that represents not only the shape of a road but also the structure of a road (such as three-dimensional intersection). The information on road shapes represents an intersection, curve, gradient or the like by the shape or magnitude of a road, the number of lanes, etc.

Information on features is information regarding features, that is, information on features that represent traffic rules which the driver should follow when driving the vehicle.

Information on roads acquired by the information acquisition unit 3 includes not only information on roads on the travel route but also information on roads connecting to the roads on the travel route. For example, when a traffic signal exists on the travel route, the information on roads includes not only road information of the road on which the travel of the vehicle is planned but also information on the intersection at which the traffic signal is provided and road information of a road connecting to the intersection.

The distance measurement unit 4 measures a necessary recognition distance. The necessary recognition distance is a distance necessary for the vehicle to recognize a feature. This distance is a distance from the feature to be recognized to the subject vehicle.

The recognition determination unit 5 determines difficulty in recognizing a feature, on the basis of the object information acquired by the information acquisition unit 3 and the necessary recognition distance measured by the distance measurement unit 4. Features to which the difficulty is determined are features which the subject vehicle has to recognize when the drive control unit 10 performs the autonomous drive.

In the present embodiment, when a destination is set, a plurality of travel routes to the destination is calculated. Then, to calculate a travel route suitable for the autonomous drive, the recognition determination unit 5 determines the difficulty in recognizing a feature on the travel route. It may be possible that, when the subject vehicle travels on a travel route on which the recognition of a feature is difficult, the drive control unit 10 cannot recognize a feature necessary for the autonomous drive, using the sensor 12, so that the autonomous drive may not be normally performed. The recognition determination unit 5 therefore sets an avoidance location on the travel route while determining the difficulty in recognizing a feature on the travel route.

The recognition degree calculation unit 6 calculates a recognition degree of a feature on the basis of the object information and the necessary recognition distance. The recognition degree is an index of recognizability of the feature by the subject vehicle. The recognition degree is determined in accordance with the distance from the vehicle to the feature or the direction from the vehicle to the feature.

As the recognition degree increases for a feature, the vehicle can readily recognize the feature. That is, in the present embodiment, the difficulty in recognizing a feature is calculated using the recognition degree that defines the recognizability and it is therefore possible to perceive a feature that is easy to recognize and a feature that is difficult to recognize in the travel scene in which the behavior of the subject vehicle can vary.

The recognition degree calculation unit 6 specifies the position of a feature relative to the position of the subject vehicle using the information on road shapes and information on features. The recognition degree calculation unit 6 compares the positional relationship between the position of the subject vehicle and the position of the feature with the necessary recognition distance. Then, the recognition degree calculation unit 6 perceives how much the position of the feature deviates with respect to the necessary recognition distance from the comparison result of the distances and the direction of the feature to the subject vehicle, so as to calculate the recognition degree of the feature. The recognition degree calculation unit 6 calculates the recognition degree of each of features that are necessary when performing the autonomous drive on the travel route. A specific method of calculating the recognition degree will be described later.

The avoidance location setting unit 7 sets a location that should be avoided from the route on which the subject vehicle travels, as an avoidance location. Each recognition degree is represented by a difference value in accordance with each feature because the recognition degree is determined in accordance with the position of a feature and a road shape. The avoidance location setting unit 7 sets the location of a feature of which the recognition degree is low, as an avoidance location. There may be a case in which, when the vehicle approaches the location with such a low recognition degree, the vehicle cannot recognize the feature and the drive control unit 10 cannot execute the autonomous drive. The avoidance location setting unit 7, therefore, sets the location with such a low recognition degree as an avoidance location when setting a travel route.

When an avoidance location is set at the time of calculation of the travel route, the travel route calculation unit 2 calculates the travel route to the destination while avoiding the avoidance location. The drive control unit 10 controls the drive of the vehicle on the basis of the travel route which is calculated to avoid the avoidance location.

Control of the travel route calculation device will then be described while referring to a specific example. FIG. 2 is a flowchart illustrating a control flow of the travel route calculation device. The flowchart illustrated in FIG. 2 represents a flow that is performed before the autonomous drive control is executed and performed when a destination is input by the user or the like. A specific exemplary case is assumed in which the travel route includes a plurality of intersections each with traffic signals from the current position of the vehicle to the destination. In the description below, traffic signals are mentioned as the features, for descriptive purposes, but the features are not limited to traffic signals and may also be, for example, other features such as road traffic signs.

In step S1, the vehicle information detection unit 1 detects a position of the subject vehicle as the current vehicle information of the subject vehicle. The position of a vehicle is detected by a combination of the global positioning system (GPS), a gyro-sensor, a vehicle speed sensor, and the like. The position of a vehicle is not limited to a current position of the vehicle stopping and may also be a current position of the vehicle traveling.

In step S2, the travel route calculation unit 2 calculates a travel route to a destination on the basis of the current position of the vehicle. The travel route is a route on which the subject vehicle is to travel from there. The travel route may be calculated using a car navigation system. Calculation of the travel route may not necessarily obtain a lane in which the vehicle should travel, and suffices to determine whether the vehicle should go straight ahead on the route or go straight through, turn right or turn left at an intersection.

In step S3, the information acquisition unit 3 acquires object information from the database 11. In step S4, the recognition determination unit 5 specifies a feature regarding traffic rules on the traffic route from the object information. The feature to be specified is that the subject vehicle must follow when traveling on the travel route. When the travel route includes a plurality of traffic signals, the recognition determination unit 5 specifies the traffic signal at each point. The recognition determination unit 5 specifies traffic signals at all of the intersections on the travel route.

In step S5, the recognition determination unit 5 specifies a layout from the position of the specified feature and information on road shapes included in the object information. The layout represents the shape of a road and the positional relationship between the road and the feature. For example, when the road shape includes an intersection, the layout represents the shape of the intersection and the relationship of the position of each traffic signal provided at the intersection.

Figure 3A:
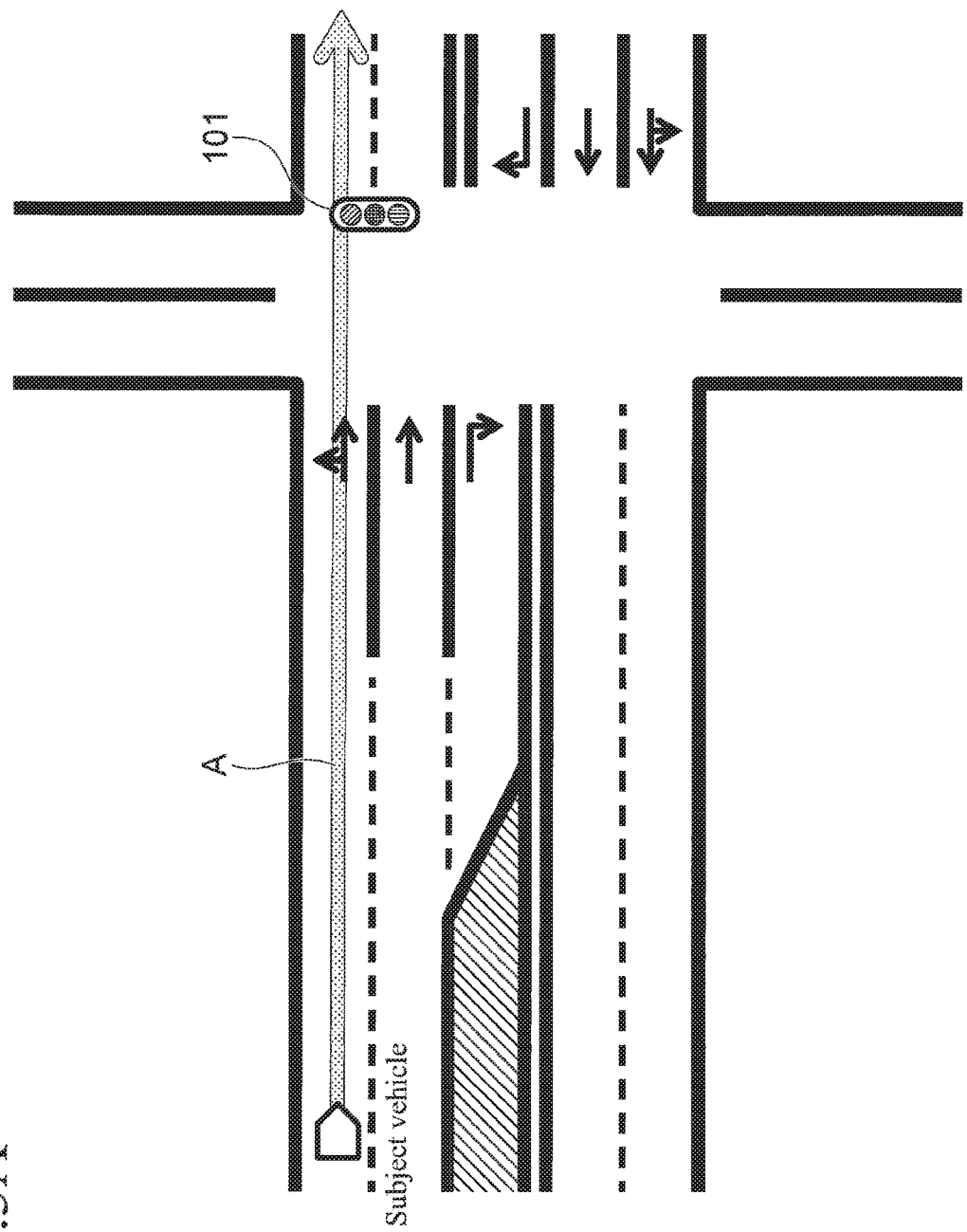
FIG. 3A is a view illustrating an example of the layout of a road.

With reference to FIG. 3A to FIG. 3C which illustrate three patterns of layouts, the positional relationship between a road on the travel route and a feature will be described. FIG. 3A to FIG. 3C are views illustrating three different patterns of intersections provided with traffic signals. Arrows illustrated in FIG. 3A to FIG. 3C each represent the travel route of the subject vehicle.

The recognition determination unit 5 specifies a traffic signal 101 as a feature regarding traffic rules. The recognition determination unit 5 specifies the shape of a road on which the traffic signal 101 is provided. Then, the recognition determination unit 5 perceives the travel route of the subject vehicle and the position of the traffic signal 101 on the layout of the road which is represented by the specified road shape. For example, in the example of FIG. 3A, the recognition determination unit 5 specifies that, on the travel route of the subject vehicle, the traffic signal 101 is provided beyond the intersection in the straight-ahead direction of the vehicle. The recognition determination unit 5 also specifies the dimensions of the intersection.

In the case in which the subject vehicle performs autonomous drive in the example of FIG. 3A, the drive control unit 10 recognizes the traffic signal 101 using the sensor 12 and the like when the subject vehicle is located at a position separate from the traffic signal 101 by the necessary recognition distance. When the indication of the traffic signal 101 is red, the drive control unit 10 controls the vehicle to stop at the stop line of the intersection or stop behind a frontward vehicle. In such an example of the autonomous drive control, the feature necessary for the subject vehicle to decide its action is the traffic signal 101. The action decision represents the operation to make the vehicle stop due to the red signal.

In the example of FIG. 3B, the recognition determination unit 5 specifies that a traffic signal 102 is provided in the opposite lane to the travel lane of the subject vehicle. The recognition determination unit 5 also specifies the dimensions of the intersection. In the example of FIG. 3C, the recognition determination unit 5 specifies that a traffic signal 104 is provided beyond the intersection in the straight-ahead direction of the vehicle and a traffic signal 103 is provided in the opposite lane to the travel lane of the subject vehicle. The recognition determination unit 5 also specifies, regarding the dimensions of the intersection, that the intersection is larger than those illustrated in FIG. 3A and FIG. 3B. Specifying a traffic signal may include specifying the direction in which the traffic signal is provided (vertical or horizontal direction).

In step S6, the distance measurement unit 4 measures a necessary recognition distance. The necessary recognition distance is a distance that is necessary for the autonomous drive to recognize a feature when recognizing the feature to decide an action. The necessary recognition distance is a distance from the position of the feature to the subject vehicle. Since the feature is specified by the recognition determination unit 5, the distance measurement unit 4 acquires the position of the feature on the travel route from the recognition determination unit 5. For example, in the example of FIG. 3A, the necessary recognition distance is a distance within which the drive control unit 10 can recognize the traffic signal 101 on the travel route, that is, a distance defined by a position separate from the intersection of the traffic signal 101 by a certain distance. The certain distance may be preliminarily determined or may also be determined in accordance with the braking distance of the vehicle. That is, the necessary recognition distance represents, as a distance, a condition necessary for the drive control unit 10 to recognize the traffic signal 101 when deciding an action.

The necessary recognition distance may be changed in accordance with positions of features on the layout. For example, assume an autonomous drive in which a vehicle stops at a stop line when the traffic signal is set before an intersection on the travel route. In this case, the position of the stop line and the position of the traffic signal are close to each other and, therefore, when the necessary recognition distance can be ensured at least as an amount corresponding to the braking distance of the vehicle, the vehicle can stop at the stop line while recognizing the traffic signal.

On the other hand, assume an autonomous drive in which a vehicle stops at the stop line when the traffic signal is set beyond the intersection on the travel route (see FIG. 3C). In this case, the traffic signal is set at a position farther than the stop line on the travel route. The necessary recognition distance is therefore a distance obtained by adding the distance between the stop line and the traffic signal to the braking distance of the vehicle.

In step S7, the recognition degree calculation unit 6 calculates a recognition degree on the basis of the layout and the necessary recognition distance. In the example of FIG. 3A, when the subject vehicle is traveling at a position separate from the position of the intersection by the necessary recognition distance, the traffic signal 101 is located on the travel route and at the front of the subject vehicle. The dimensions of the intersection are smaller than those of the intersection of FIG. 3C. The sensor 12 can capture the traffic signal 101 at the front of the camera and at a position near the sensor 12. In the layout of FIG. 3A, therefore, the traffic signal 101 is a feature that is easy for the drive control unit 10 to recognize, and the recognition degree of the traffic signal 101 is thus high.

In the example of FIG. 3B, the traffic signal 102 is located at the forward right side when viewed from the subject vehicle. The camera of the sensor 12 has its optical axis in the travel direction of the vehicle, so the brightness of the traffic signal 102 will be low when detected by the camera. The sensor 12 cannot capture the traffic signal 102 at the front of the camera. In the layout of FIG. 3B, therefore, the traffic signal 101 is a feature that is most difficult for the drive control unit 10 to recognize, and the recognition degree of the traffic signal 101 is thus lowest.

In the example of FIG. 3C, the traffic signal 103 is located at the same position as that of the traffic signal 102 illustrated in FIG. 3B and is therefore a feature that is difficult for the drive control unit 10 to recognize. On the other hand, the traffic signal 104 is located at a similar position to that of the traffic signal 101 illustrated in FIG. 3A and at the front of the subject vehicle. Note, however, that the distance from the subject vehicle to the traffic signal 104 is longer than the distance from the subject vehicle to the traffic signal 101 because the intersection of FIG. 3C is larger than the intersection of FIG. 3A. In the layout of FIG. 3C, therefore, the traffic signal 104 is a feature that is more difficult for the drive control unit 10 to recognize than the traffic signal 101 of FIG. 3A, but a feature that is more easy for the drive control unit 10 to recognize than the traffic signal 102 of the FIG. 3B. In addition or alternatively, the drive control unit 10 can add information on the traffic signal 103 to information on the traffic signal 104 thereby to enhance the recognition degree of the state of traffic signals. Thus, the recognition degree at the intersection of the traffic signals 103 and 104 is lower than the recognition degree of the traffic signal 101 of FIG. 3A and higher than the recognition degree of the traffic signals 102 of FIG. 3B. That is, in the examples illustrated in FIG. 3A to FIG. 3C, the recognition degree is in the order of FIG. 3A, FIG. 3C and FIG. 3B in descending order.

Thus, when the drive control unit 10 recognizes a feature at a position separate from the feature by the necessary recognition distance on the travel route, the recognition degree calculation unit 6 calculates the recognizability due to the position of the feature on the layout, as the recognition degree. The recognition degree calculation unit 6 calculates the recognition degree for each of the features on the travel route.

When the travel route includes a plurality of features which the driver should follow, the controls flows of steps S5 to S10 are performed for a feature nearest to the subject vehicle and the controls flows of steps S5 to S10 are then performed for the second-to-nearest feature to the subject vehicle. Thus, the control flow of steps S5 to S7 is performed for each of all the features which exist on the travel route on which the subject vehicle is to travel from the current position.

In step S8, the recognition determination unit 5 compares the recognition degree with a threshold. The threshold is preliminarily set in accordance with the detection range or the like of the sensor 12 used when detecting a feature. In the examples of FIG. 3A to FIG. 3C, the threshold is set to a value between the recognition degree of the traffic signals 103, 104 illustrated in FIG. 3C and the recognition degree of the traffic signal 102 illustrated in FIG. 3B.

When the recognition degree is lower than the threshold, the recognition determination unit 5 determines, in step S9, that the feature as an object of determination is difficult to recognize. On the other hand, when the recognition degree is not lower than the threshold, the recognition determination unit 5 determines, in step S10, that the feature as an object of determination is possible to recognize. This allows the recognition determination unit 5 to determine the difficulty in recognizing the feature. The recognition determination unit 5 executes the control flow of step S8 to S10 for all the features on the travel route thereby to determine the difficulty in recognizing each feature.

In step S11, the avoidance location setting unit 7 specifies a location at which the recognition degree is lower than the threshold and the recognition of a feature is difficult, as an avoidance location. As for the examples of FIG. 3A to FIG. 3C, the intersections illustrated in FIG. 3A and FIG. 3C are not set as avoidance locations, but the intersection illustrated in FIG. 3B is set as an avoidance location. More specifically, as for the intersection illustrated in FIG. 3B, the traffic signal 102 is deviated in the perpendicular direction to the travel direction of the vehicle and is thus calculated as a location that is difficult for the drive control unit 10 to recognize. The intersection illustrated in FIG. 3B is therefore set as an avoidance location.

In step S12, the travel route calculation unit 2 calculates a travel route from the current position of the vehicle to the destination while avoiding the avoidance location. A method of calculating the travel route may be to use a scheme based on a graph search theory, such as Dijkstra's algorithm. In addition or alternatively, the travel route calculation unit 2 may weight a link connected to an avoidance location (node) more than other links and calculate a travel route that does not pass through the weighted link. The calculation result from the travel route calculation unit 2 is output to the drive control unit 10. The control flow illustrated in FIG. 2 is thus completed.

Thus, in one or more embodiments of the present invention, when the subject vehicle plans to travel on a route and the route includes an intersection with traffic signals which the subject vehicle has to pass through, the difficulty in recognizing a traffic signal is determined on the basis of the layout of the intersection with traffic signals before the subject vehicle actually approaches the intersection. It is therefore possible to determine whether to pass through or avoid the intersection with that traffic signal. It is also possible to calculate a travel route that allows a drive assist vehicle or autonomous drive vehicle to readily recognize features and travel thereon.

As the above, in one or more embodiments of the present invention, information on objects that affect recognition of features by the subject vehicle is acquired as the object information, and the necessary recognition distance from the subject vehicle to a feature, which is necessary for recognition of the feature, is measured. Then, the difficulty in recognizing the feature is determined on the basis of the object information and the necessary recognition distance, and the travel route is calculated while avoiding a location at which the recognition of the feature is determined to be difficult. Through this operation, the travel route of the subject vehicle to the destination is calculated in accordance with the recognizability of a feature which is necessary when deciding an action. Since the drive assist vehicle or autonomous drive vehicle can therefore calculate routes on which the vehicle can travel and routes on which the vehicle is difficult to travel, the drive assist vehicle or autonomous drive vehicle calculates a route on which the vehicle can readily recognize a feature.

In one or more embodiments of the present invention, the position of a feature on the layout is specified on the basis of the information on road shapes and positional information of features, and the difficulty in recognizing the feature is determined on the basis of the position of the feature and the necessary recognition distance. Through this operation, the recognition degree of a feature can be calculated in accordance with the layout of a road on the travel route and the positional relationship with the feature. The travel route can therefore be calculated which has a layout that allows the vehicle to readily recognize the feature.

In one or more embodiments of the present invention, a point having the road shape which causes a change in behavior of the subject vehicle, or a point having the feature which causes a change in behavior of the subject vehicle, is specified and the difficulty in recognizing the feature at such a point is determined. This allows determination of a road shape or feature which may cause a change in behavior of the subject vehicle or determination of presence or absence of a feature which may cause a change in behavior of the subject vehicle. The vehicle side can therefore perceive which kind of a travel scene exists on the route planned for the subject vehicle to travel after the calculation of the route.

In one or more embodiments of the present invention, a feature that indicates a traffic rule is specified and the difficulty in recognizing the feature is determined. This allows the vehicle side to perceive which kind of a travel scene exists on the route planned for the subject vehicle to travel after the calculation of the route.

In one or more embodiments of the present invention, the threshold when determining the difficulty is set in accordance with the detection range of the sensor 12 in order to determine the difficulty in recognizing a feature on the basis of the detection range of the sensor 12. This allows determination of the difficulty in recognizing a feature based on the detection range of the sensor, such as a camera and laser, which is equipped in the subject vehicle. It is therefore possible to perceive features existing within the range which is recognizable by the subject vehicle.

In the present embodiment, the recognition degree of a traffic signal is calculated on the basis of the position of the traffic signal on the layout, but features for which the recognition degree is calculated may be those other than traffic signals. For example, when the feature is a railroad crossing, the recognition determination unit 5 specifies the shape of a road toward the railroad crossing on the basis of the object information and then specifies the position of the railroad crossing on the road. The recognition determination unit 5 calculates the recognition degree of the railroad crossing in accordance with the position or direction of the railroad crossing with respect to the subject vehicle. Then, the recognition determination unit 5 compares the recognition degree with a threshold to determine the difficulty in recognizing the railroad crossing.

In a modified example of the present invention, the recognition degree calculation unit 6 calculates recognition degrees on each of a plurality of travel routes at each location of a plurality of features present on each travel route and calculates the sum of recognition degrees on each of the plurality of travel routes. Then, the travel route calculation unit 2 calculates a travel route, on which the sum is highest, out of the plurality of travel routes as the travel route on which the subject vehicle travels. Through this operation, it is possible to calculate a travel route, which is easy for the subject vehicle to recognize, out of the plurality of travel routes and a more natural travel route can be calculated, such as a travel route on which right and left turn do not repeat. In an alternative embodiment, the recognition degree calculation unit 6 may calculate the number of recognition degrees higher than a predetermined value on each travel route as substitute for the sum of recognition degrees and the travel route calculation unit 2 may calculate a travel route, on which the number of recognition degrees is largest, as the travel route on which the subject vehicle travels.

In a modified example of the present invention, the recognition determination unit 5 specifies a point at which behavior of the subject vehicle and behavior of another vehicle interfere with each other due to the layout of a road, as the point for determining the difficulty in recognizing a feature. Then, the recognition degree calculation unit 6 calculates the recognition degree of the feature at that point and the recognition determination unit 5 thereby determines the difficulty in recognizing the feature at that point. The point at which behavior of the subject vehicle and behavior of another vehicle interfere with each other refers not only to an intersection but, for example, to a merging point and branching point. It is therefore possible to perceive the travel scene in which the behavior of the subject vehicle may vary.

In the above, an example is described in which the travel route calculation device is equipped in an autonomous drive vehicle, but the travel route calculation device may also be equipped in a drive assist vehicle. The drive assist vehicle is a vehicle to which drive assist is applied so as to assist the drive of a vehicle by the driver, that is, for example, the drive when changing lanes. When the lane change is assisted using a sensor such as a camera in the drive assist vehicle, the drive is assisted while recognizing the location of the lane change. The travel route calculation device calculates a travel route at which the location of the lane change can readily be recognized. Then, the drive of the drive assist vehicle is assisted on the basis of the calculated travel route.

The travel route calculation device may calculate the travel route not only when the vehicle is traveling but also when the vehicle is stopping.

The above travel route calculation unit 2 corresponds to the "travel route calculation unit" of the present invention, the information acquisition unit 3 corresponds to the "information acquisition unit" of the present invention, the distance measurement unit 4 corresponds to the "distance measurement unit" of the present invention, the recognition determination unit 5 corresponds to the "determination unit" of the present invention, the sensor 12 corresponds to the "feature detection unit" of the present invention, and the recognition degree calculation unit 6 corresponds to the "recognition degree calculation unit" of the present invention.

Second Embodiment

Figure 4:
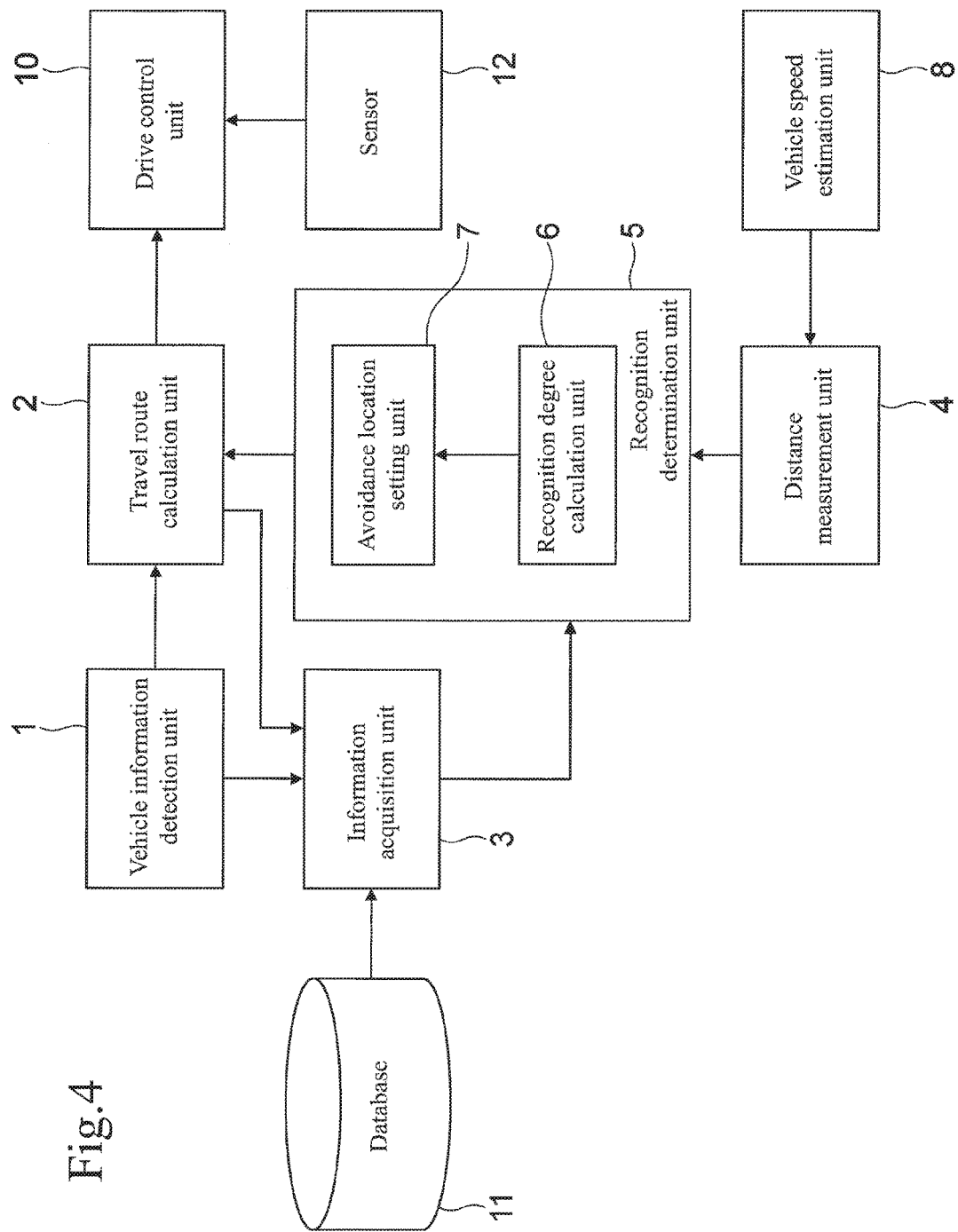
FIG. 4 is a block diagram of a travel route calculation device according to another embodiment of the present invention.

FIG. 4 is a block diagram of a travel route calculation device according to another embodiment of the present invention. As compared with the above-described first embodiment, this embodiment is different in that the travel route calculation device has a vehicle speed estimation unit 8 and the distance measurement unit 4 and the recognition determination unit 5 are controlled partially in a different manner. Other features are the same as those in the above-described first embodiment and the description is borrowed herein.

The travel route calculation device according to the present embodiment comprises a vehicle speed estimation unit 8 in addition to the configuration of the vehicle information detection unit 1 and other units. The vehicle speed estimation unit 8 estimates a vehicle speed of the subject vehicle when traveling toward a feature on the travel route.

Figure 5:
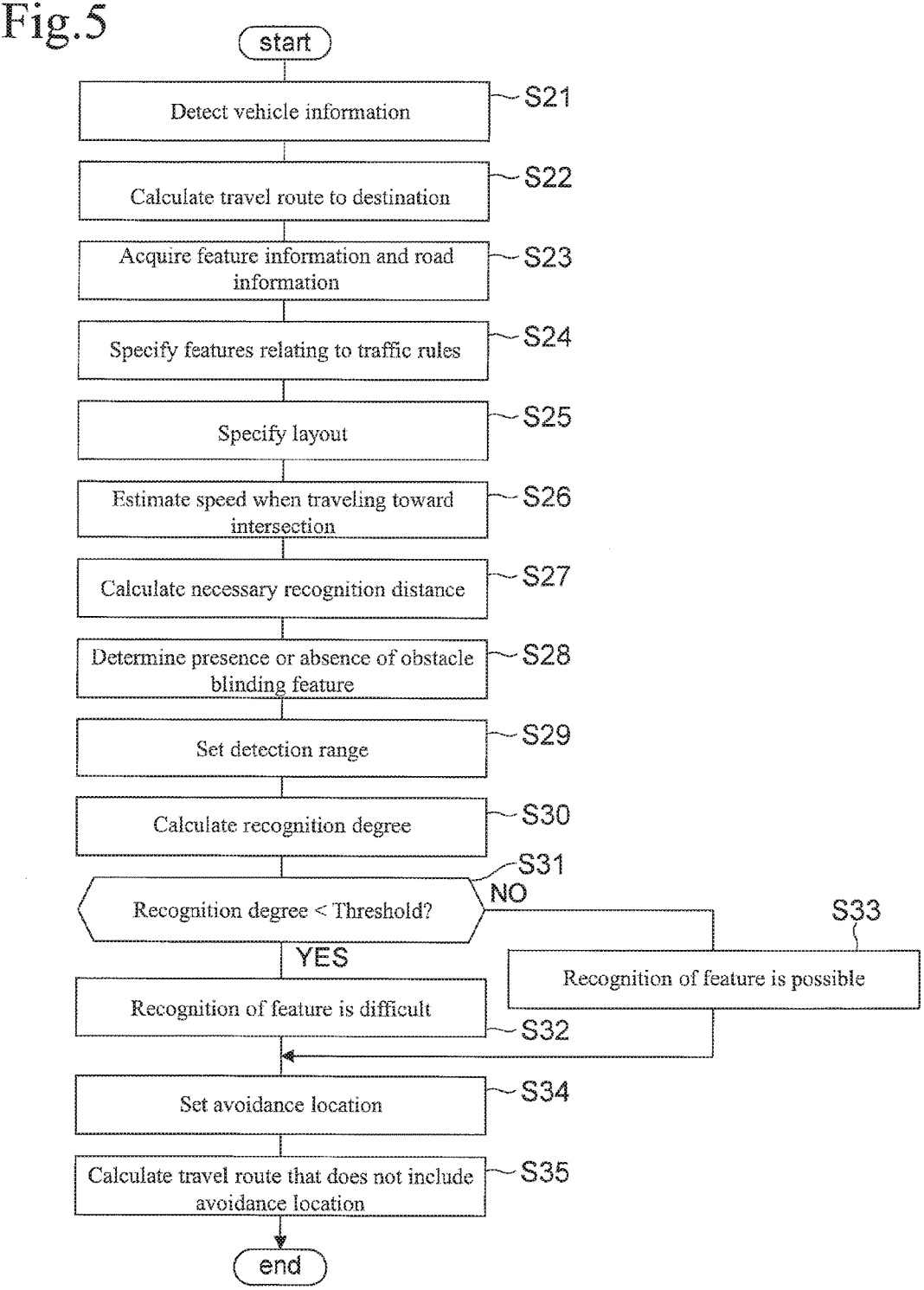
FIG. 5 is a flowchart illustrating a control flow of a travel route calculation device.

Control of the travel route calculation device will then be described while referring to a specific example. FIG. 5 is a flowchart illustrating a control flow of the travel route calculation device.

The control flow of steps S21 to S24 is the same as the control flow of steps S1 to S4 of the first embodiment. The control flow of step S25 is similar to the control flow of step S5 of the first embodiment, but the specific examples are different.

Figure 6A:
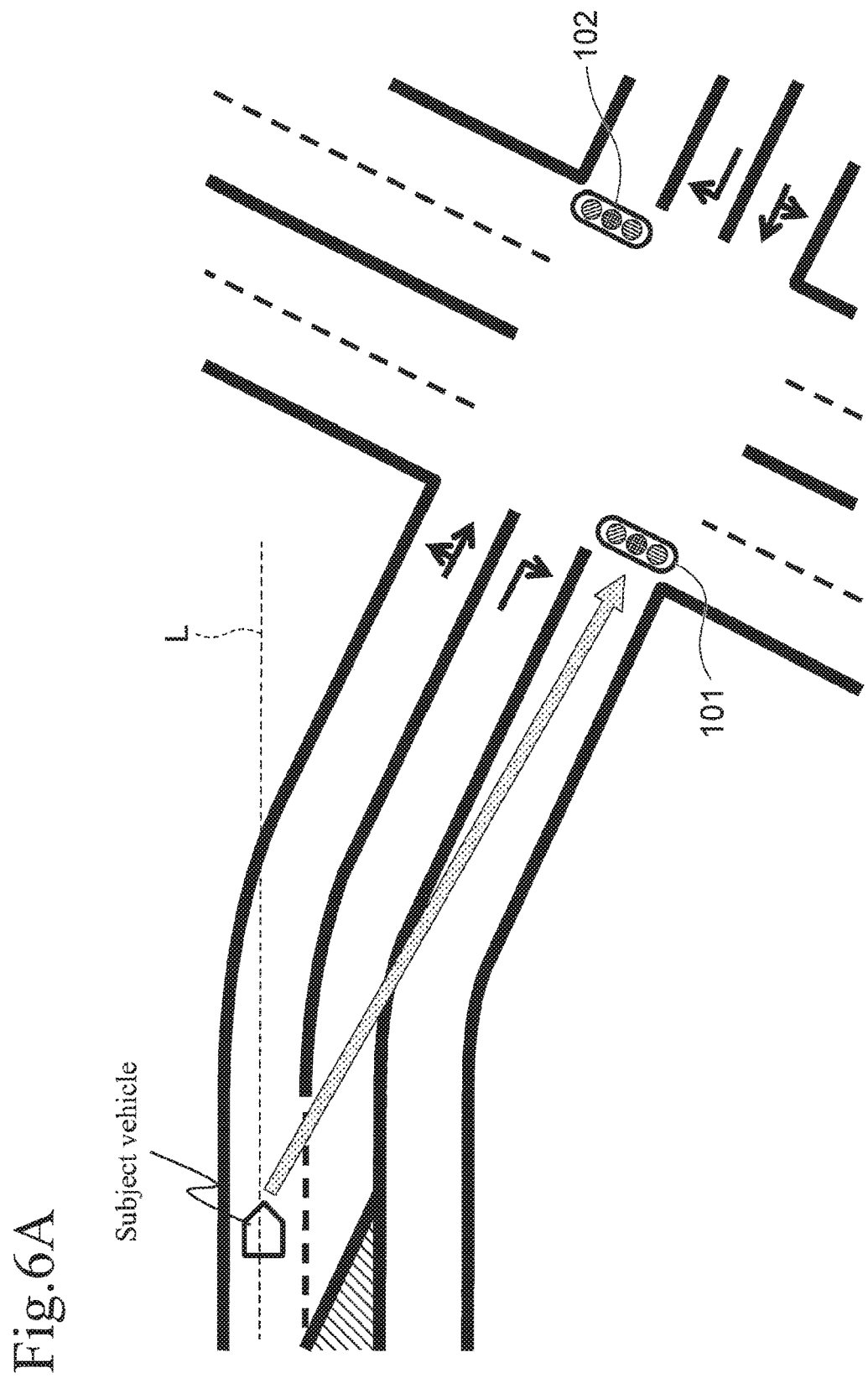
FIG. 6A is a view illustrating an example of the layout of a road.

With reference to FIG. 6A to FIG. 6C which illustrate three patterns of layouts, the positional relationship between a road on the travel route and a feature will be described. FIG. 6A to FIG. 6C are views illustrating three different patterns of intersections provided with traffic signals.

For example, in the example of FIG. 6A, the recognition determination unit 5 specifies the existence of an intersection on the travel route of the subject vehicle and specifies that the road before the intersection includes a curve. The recognition determination unit 5 also specifies the positions of two traffic signals 101 and 102 at the intersection. The curve before the intersection curves to the right with respect to the travel direction of the subject vehicle. The traffic signal 101 is provided in the opposite lane to the travel lane of the subject vehicle. The traffic signal 102 is provided in the same lane as the travel lane of the subject vehicle but at a location beyond the intersection.

In the example of FIG. 6B, the recognition determination unit 5 specifies an intersection and a curve before the intersection in the same manner as in FIG. 6A and specifies the position of a traffic signal 103. The traffic signal 103 is provided in the same lane as the travel lane of the vehicle and before the intersection.

In the example of FIG. 6C, the recognition determination unit 5 specifies an intersection and a curve before the intersection in the same manner as in FIG. 6A and specifies the positions of traffic signals 101 and 102 and a traffic sign 201. The positions of the traffic signals 101 and 102 are the same as those in FIG. 6A. The traffic sign 201 is provided between the subject vehicle and the traffic signal 101.

In step S26, the vehicle speed estimation unit 8 estimates a vehicle speed at which the subject vehicle travels toward the feature specified by the recognition determination unit 5. The database 11 stores a legal speed of each road as the map data. The vehicle speed estimation unit 8, therefore, refers to the position of the feature and roads on the travel route to estimate the legal speed of the road for travel toward the feature as a vehicle speed of the subject vehicle.

The vehicle speed estimation unit 8 may not necessarily estimate the legal speed as the vehicle speed of the subject vehicle and the vehicle speed estimation unit 8 may also estimate a lower vehicle speed than the legal speed. This is because a vehicle cannot necessarily travel at the legal speed when traveling through an intersection. For example, the subject vehicle cannot turn at the legal speed when tuning right at an intersection. In addition, the Road Traffic Act defines that, when a vehicle turns right or left at an intersection, the vehicle must travel at a speed that allows the vehicle to stop at any time. In almost all cases, therefore, a vehicle does not travel at the legal speed at an intersection when the vehicle plans to turn. In such cases, the vehicle speed estimation unit 8 estimates a lower speed than the legal speed as the vehicle speed of the subject vehicle.

When the vehicle speed estimation unit 8 estimates a lower speed than the legal speed as the vehicle speed of the subject vehicle, the vehicle speed estimation unit 8 may estimate the vehicle speed on the basis of a vehicle speed when having traveled in past times on the road for which the vehicle speed is estimated.

In step S27, the distance measurement unit 4 measures a necessary recognition distance on the basis of the vehicle speed estimated by the vehicle speed estimation unit 8.

Here, the relationship between the behavior of a vehicle and the necessary recognition distance will be described.

Behavior conditions of a vehicle traveling, for example, toward an intersection may be severe when the amount of braking operation has to be suddenly increased, for example, or when the steering angle of a steering wheel has to be suddenly increased. For example, when a vehicle is to travel straight through an intersection but the signal turns red, the behavior conditions of the vehicle will be severe.

Assume that the subject vehicle is traveling at a location before an intersection, v [km/h] represents the speed when traveling toward the intersection, and t represents a time required for the subject vehicle to decelerate using a fixed deceleration (0.15 G) from the location at which the action decision is performed to the stop line of the intersection. The location at which the action decision is performed is a location at which the braking operation is started to stop at the stop line. The stop position of the subject vehicle is assumed to be the same position as the position of the traffic signal, for easy description.

The distance (d [m]) from the location at which the action decision is performed to the stop line of the intersection is represented by Equation (1).

[Expression 1]

$$d = \frac{v}{3.6} \times t - \frac{1}{2} \times (0.15 \times 9.8) \times t^2 \quad (1)$$

In addition, the relationship between the speed (v) when traveling toward the intersection and the time (t) is represented by Equation (2).

[Expression 2]

$$\frac{v}{3.6} = (0.15 \times 9.8) \times t \quad (2)$$

The distance (d) is therefore represented by Equation (3) from Equations (1) and (2).

[Expression 3]

$$d = \frac{v^2}{2 \times 3.6^2 \times (0.15 \times 9.8)} \quad (3)$$

Given that the legal speed is 60 [km/h], for example, v=60 [km/h] is substituted into Equation (3) to obtain d=94.48 [m]. The behavior of a vehicle is such that, when the vehicle is traveling at a vehicle speed (v=60 [km/h]) toward the intersection, the braking distance is 94.48 [m]. In the case of autonomous drive, in order that the subject vehicle stops at the stop line in accordance with such behavior of a vehicle, the subject vehicle has to recognize the traffic signal while ensuring the braking distance. That is, the braking distance represented by Equation (3) corresponds to the necessary recognition distance and the distance measurement unit 4 can measure the necessary recognition distance using the above arithmetic expression.

In step S28, the recognition determination unit 5 determines the presence or absence of an obstacle located around the feature. The location around the feature falls within a range separated from the position of the feature by the necessary recognition distance, and this range is located between the subject vehicle and the feature. In other words, the recognition determination unit 5 determines whether or not there is an obstacle that blinds the feature when the subject vehicle recognizes the feature. In the example of FIG. 6C, the traffic sign 201 exists between the traffic signal 101 and the subject vehicle. In such a case, even when the drive control unit 10 uses the sensor 12 to capture an image in the travel direction of the subject vehicle, the traffic signal 101 is blinded by the traffic sign 201 and cannot be detected. In the example of FIG. 6C, therefore, the recognition determination unit 5 determines that an obstacle exists around the feature.

In step S29, the recognition determination unit 5 sets a detection range for the feature with respect to the position of the subject vehicle. The position of the subject vehicle is a position separate from the feature as a recognition object by a distance corresponding to the necessary recognition distance.

For example, assume that the subject vehicle is provided with a plurality of sensors such as a millimeter-wave device, radar and laser in addition to the sensor 12 as the sensor for recognizing the feature and these sensors complement each detection range of the sensors Here, the detection distance of a sensor as the typical value (nominal value) of the sensor performance may be 200 meters in the case of a millimeter-wave device, hundreds of meters in the case of radar, 100 meters in the case of laser, and tens of meters in the case of a camera.

The detection range of a sensor may be defined not only by a distance but by an angle. The detection range of a millimeter-wave device is relatively narrow angle, but the detection range of a camera can be selected to be narrow or wide because of a wide angle of lenses.

When a plurality of sensors is arranged such that they cover the same range to reduce erroneous recognition, the maximum detection range by these sensors may be used as the detection range of the sensors or the minimum detection range may be used as the detection range of the sensors.

Figure 7A:
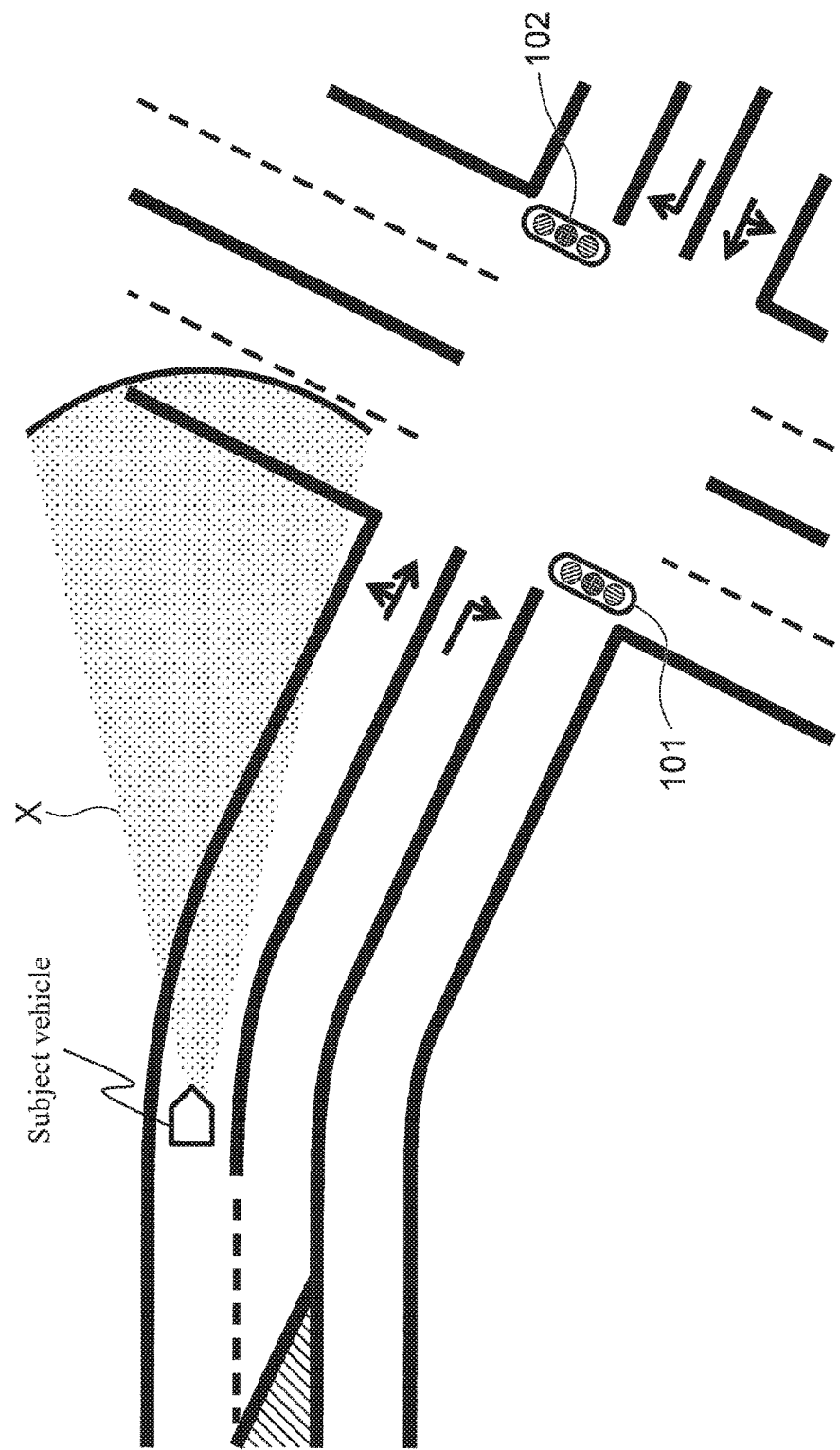
FIG. 7A is a view illustrating an example of the layout of a road.

The description below will be made on the assumption that the imaging range of a camera of the sensor 12 corresponds to the detection range (e.g. 50 meters) of the sensor, for easy description. FIG. 7A and FIG. 7B are views each illustrating the same layout as that of FIG. 6A. FIG. 7A is a view for describing a detection range when using a lens of narrow angle for the sensor 12 while FIG. 7B is a view for describing a detection range when using a lens of wide angle for the sensor 12. In FIG. 7A and FIG. 7B, X represents the detection range.

In the example of FIG. 7A, the subject vehicle cannot recognize the traffic signals 101 and 102 because the traffic signals 101 and 102 fall outside the detection range. In the example of FIG. 7B, the subject vehicle can recognize the traffic signal 101 because the traffic signal 101 exists within the detection range.

In step S30, the recognition degree calculation unit 6 calculates a recognition degree of the feature on the basis of the layout, necessary recognition distance, presence or absence of an obstacle, and detection range of the sensor 12. Information representing the layout includes not only the road shape of an intersection provided with traffic signals but also the curvature of a road before the intersection. Information on the curvature of a road is stores in the database 11 as information on roads. For example, when the road curves before the intersection as illustrated in FIG. 6A, the traffic signal cannot be recognized just at the front of the position of the subject vehicle illustrated in FIG. 6A (cannot be recognized in the direction along the broken line L of FIG. 6A). When the subject vehicle enters the straight road from the position illustrated in FIG. 6A, the subject vehicle can recognize the traffic signal just at the front of the subject vehicle. To recognize the traffic signal just at the front, therefore, the subject vehicle may have to approach the intersection. That is, when the road before the intersection is a curve having a certain curvature and the traffic signal 101 deviates from the direction just at the front of the subject vehicle as illustrated in FIG. 6A, the recognition degree is low.

On the other hand, even when the road before the intersection curves as illustrated in FIG. 6B, the traffic signal 103 may be more readily recognized than the traffic signal 101 illustrated in FIG. 6A because the position of the traffic signal 103 is closer to the direction just at the front of the subject vehicle (broken line L) than the position of the traffic signal 101. The recognition degree calculation unit 6, therefore, calculates the recognition degree of the traffic signal 103 to be higher than the recognition degree of the traffic signal 101.

Information on the layout may include not only the curvature of a road but the gradient of a road. For example, when the subject vehicle travels toward an intersection with traffic signals and a road before the intersection is a slope, the subject vehicle may more difficult to recognize a traffic signal as compared with the case in which the road before the intersection is flat. The recognition degree calculation unit 6 calculates the recognition degree on the basis of the gradient of a road. For example, as the gradient of a road increases, the recognition degree calculation unit 6 calculates a lower recognition degree.

When an obstacle is present around a feature as the calculation object, the recognition degree calculation unit 6 calculates the recognition degree to be lower as compared with the case in which an obstacle is not present. For example, comparing FIG. 6A and FIG. 6C, the traffic sign 201 which blinds the traffic signal 101 exists in the case illustrated in FIG. 6C. The recognition degree calculation unit 6, therefore, performs calculation such that the recognition degree in the case of FIG. 6C is lower than the recognition degree in the case of FIG. 6A.

The obstacle is not limited to the traffic sign 201 and may also be, for example, a building or tree. Information on buildings and trees may be stored in the database 11 as map data.

The recognition degree calculation unit 6 calculates the recognition degree of a feature on the basis of the detection range of the sensor 12. Specifically, the recognition degree calculation unit 6 performs calculation such that the recognition degree when the feature as a calculation object is located within the detection range is higher than the recognition degree when the feature as a calculation object is located outside the detection range. For example, comparing FIG. 7A and FIG. 7B, the traffic signal 101 is located within the detection range of the sensor 12 in the case illustrated in FIG. 7B. The recognition degree calculation unit 6, therefore, performs calculation such that the recognition degree in the case of FIG. 7B is higher than the recognition degree in the case of FIG. 7A.

The control flow of steps S31 to S35 is the same as the control flow of steps S8 to S12 in the first embodiment.

Thus, in one or more embodiments of the present invention, when the subject vehicle plans to travel on a route and the route includes an intersection with traffic signals which the subject vehicle has to pass through, a determination is made for the difficulty in recognizing a traffic signal due to the layout of roads including the curvature or gradient of a road, the presence or absence of an obstacle, and the detection range of the sensor 12 before the subject vehicle actually approaches the intersection. It is therefore possible to determine whether to pass through or avoid the intersection with that traffic signal. It is also possible to calculate a travel route that allows a drive assist vehicle or autonomous drive vehicle to readily recognize features and travel thereon.

As the above, in one or more embodiments of the present invention, the vehicle speed of the subject vehicle is estimated and the necessary recognition distance is measured on the basis of the estimated vehicle speed. This allows measurement of the necessary recognition distance under a vehicle condition when actually traveling on the travel route.

In one or more embodiments of the present invention, the legal speed is estimated as the vehicle speed and the necessary recognition distance is measured on the basis of the legal speed. This allows determination of the difficulty in recognizing a feature under the most severe speed condition.

In one or more embodiments of the present invention, a vehicle speed when having traveled in past times is estimated as the vehicle speed and the necessary recognition distance is measured on the basis of the estimated speed. This allows determination of the difficulty in recognizing a feature under a typical speed condition.

In one or more embodiments of the present invention, the difficulty in recognizing a feature is determined on the basis of the presence or absence of an obstacle located around the feature. Through this operation, a feature that is difficult to recognize due to such an obstacle can be perceived.

In one or more embodiments of the present invention, the difficulty in recognizing a feature is determined on the basis of the curvature of a road or the gradient of a road. Through this operation, a feature that is difficult to recognize due to the curvature of a road or the gradient of a road can be perceived.

The vehicle speed estimation unit 8 may select one of a vehicle speed when having traveled in past times or a legal speed in accordance with the hour and date planned for travel, weather condition when traveling, etc., and estimate the selected speed as a vehicle speed. This allows the difficulty in recognizing a feature to be determined in accordance with conditions that affect the vehicle speed.

The above vehicle speed estimation unit 8 corresponds to the vehicle speed estimation unit of the present invention.

Third Embodiment

A travel route calculation device according to still another embodiment of the present invention will be described. As compared with the above-described first embodiment, a part of control of the recognition determination unit 5 is different. The configuration of the travel route calculation device is the same as the configuration according to the second embodiment. The description of the first and second embodiments is borrowed herein for the third embodiment.

Control of the travel route calculation device will be described while referring to a specific example. FIG. 8 is a flowchart illustrating a control flow of the travel route calculation device.

The control flow of steps S41 to S51 is the same as the control flow of steps S1 to S11 of the first embodiment.

In step S52, the vehicle speed estimation unit 8 calculates the acceleration or deceleration when traveling toward the avoidance location set in step S51.

Figure 9A:
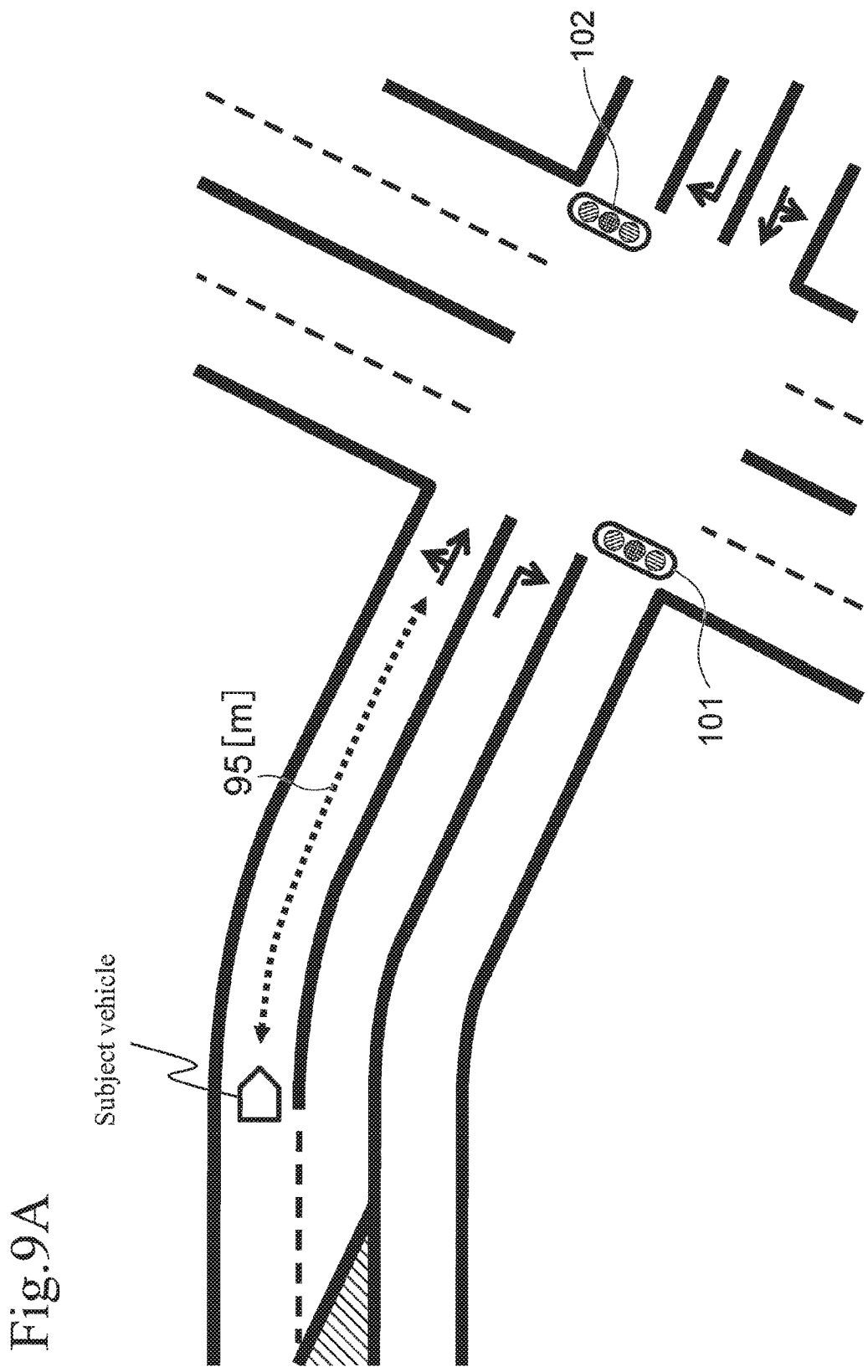
FIG. 9A is a view illustrating an example of the layout of a road.
Figure 9B:
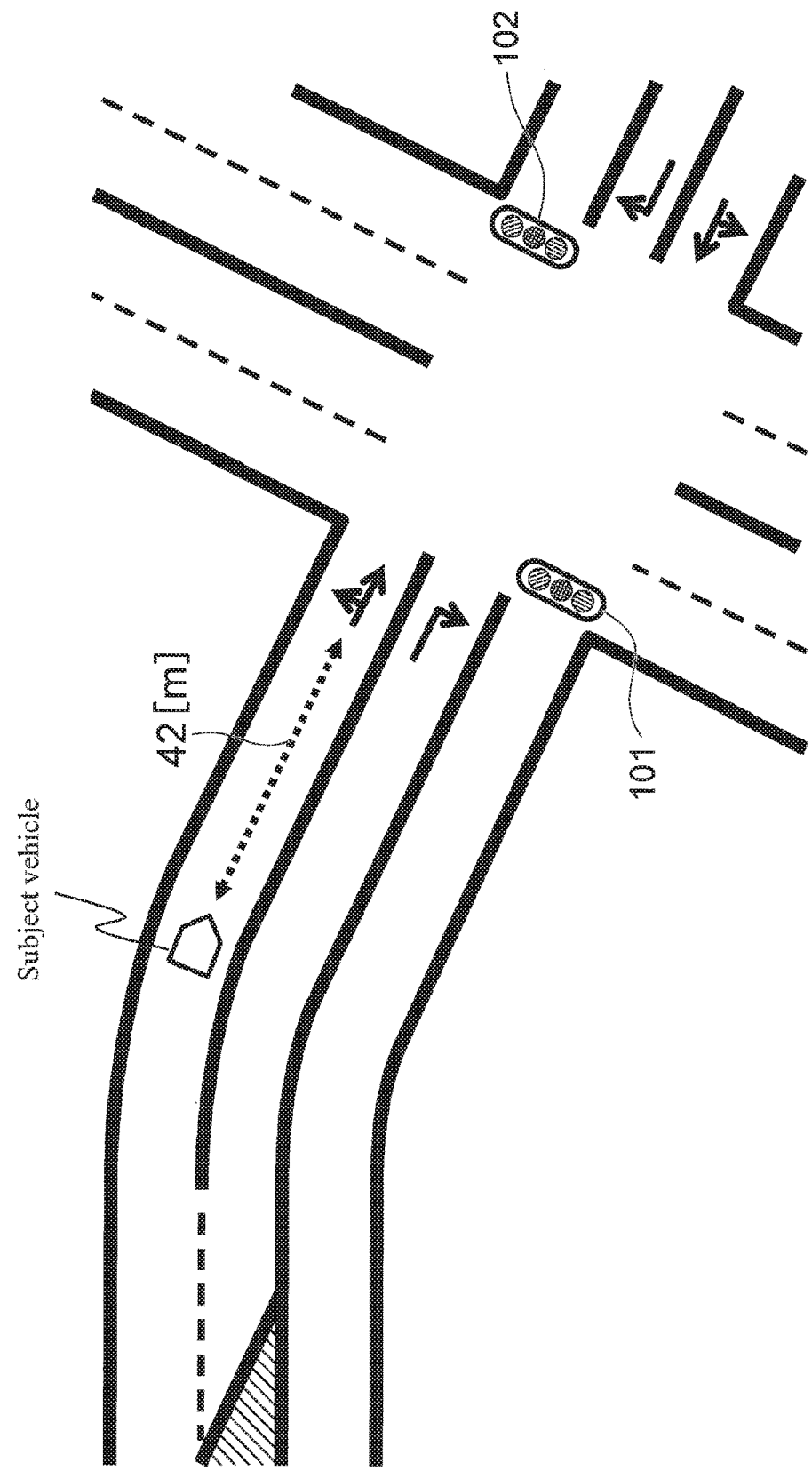
FIG. 9B is a view illustrating an example of the layout of a road.

Here, the relationship between the distance from the subject vehicle to an intersection and the acceleration or deceleration will be described with reference to FIG. 9A and FIG. 9B. FIG. 9A and FIG. 9B are views each illustrating the layout of an intersection with traffic signals. The difference between FIG. 9A and FIG. 9B is the position of the subject vehicle. The layout of roads illustrated in FIG. 9A and FIG. 9B is the same as that of FIG. 6A.

For example, assume that, as illustrated in FIG. 9A, the subject vehicle is traveling on the curve at 60 [km/h] and the traffic signals 101 and 102 turn red. In this case, to stop at the stop line, the subject vehicle requires a braking distance of about 95 [m] at deceleration of 0.15 G. Thus, in order for the subject vehicle to decelerate at 0.15 G from the state of traveling at 60 [km/h] to stop at the stop line, the subject vehicle has to recognize the traffic signal 101 at a position of the curve separate from the traffic signal 101 by the braking distance (about 95 [m]).

On the other hand, if the subject vehicle can decelerate from 60 [km/h] to 40 [km/h] as illustrated in FIG. 9B, the braking distance necessary for the subject vehicle to stop at the stop line of the intersection can be reduced from 95 [m] to 42 [m].

When the necessary recognition distance is 95 [m] in the example of FIG. 9A, the subject vehicle cannot capture the traffic signals 101 and 102 at the front from the position of the curve. The recognition degree calculation unit 6, therefore, calculates the recognition degree of the traffic signals 101 and 102 as a low value (corresponding to the control flow of step S47 of FIG. 8). The recognition degree in the example of FIG. 9A is lower than the threshold and the location of the intersection illustrated in FIG. 9A is thus set as an avoidance location.

The vehicle speed estimation unit 8 assumes that the subject vehicle decelerates during the drive at the curve on the basis of the layout of the road as illustrated in FIGS. 9A and 9B and the vehicle speed estimation unit 8 calculates the speed to which the subject vehicle decelerates when traveling toward the avoidance location. Specifically, the vehicle speed estimation unit 8 estimates that the subject vehicle decelerates from 60 [km/h] to 40 [km/h].

In step S53, the distance measurement unit 4 calculates the necessary recognition distance on the basis of the vehicle speed at each stage of the deceleration. The necessary recognition distance is a distance from the subject vehicle to the feature in a state in which the subject vehicle decelerates to the vehicle speed estimated by the vehicle speed estimation unit 8. The feature is provided at the location which is set as an avoidance location. This allows the distance measurement unit 4 to calculate the necessary recognition distance on the basis of the behavior of the subject vehicle. The behavior of the subject vehicle is, in the example of FIG. 9B, to decelerate at the curve before the intersection. Then, the recognition degree calculation unit 6 recalculates the recognition degree on the basis of the necessary recognition distance after the deceleration and the layout.

As for the examples of FIG. 9A and FIG. 9B, the recognition degree of FIG. 9A is a low value, but the recognition degree can be high due to a reduced speed as in FIG. 9B because such a reduced speed allows the subject vehicle to recognize the traffic signals 101 and 102 which the subject vehicle has to recognize.

In step S54, the recognition determination unit 5 compares the recalculated recognition degree with the threshold. When the recognition degree is not lower than the threshold, the recognition determination unit 5 determines that the setting of the avoidance location can be canceled, and the routine proceeds to step S55. In step S55, the avoidance location setting unit 7 cancels the setting of the avoidance location. On the other hand, when the recognition degree is lower than the threshold, the recognition determination unit 5 determines that the setting of the avoidance location cannot be canceled, and the avoidance location setting unit 7 does not cancel the setting of the avoidance location.

In step S56, the travel route calculation unit 2 calculates a travel route from the current position of the vehicle to the destination while avoiding the avoidance location. The control flow illustrated in FIG. 8 is thus completed.

Thus, in one or more embodiments of the present invention, when the subject vehicle decelerates before reaching an intersection in the case in which the subject vehicle plans to travel on a route including the intersection and has to pass through the intersection with traffic signals, it is possible to calculate such that the intersection is to be an intersection which the subject vehicle can pass through. As a result, a travel route can be calculated which includes a small number of avoidance locations.

Deceleration of the subject vehicle is not limited to that performed at a curve before an intersection. For example, the subject vehicle may have to temporarily decelerate or stop when turning right or left at an intersection. Thus, the recognition degree of a feature can be recalculated on the basis of such behavior of the subject vehicle thereby to exclude the location provided with that feature from the avoidance locations. This results in the autonomous drive control in which the subject vehicle can pass through such an intersection while turning right or left or decelerating.

As the above, in one or more embodiments of the present invention, the necessary recognition distance is calculated on the basis of the behavior of the subject vehicle. Through this operation, the necessary recognition distance is calculated with consideration for the typical behavior of the subject vehicle (such as acceleration or deceleration and travel at a fixed speed). It is therefore possible to calculate a distance necessary when deciding an action, under a condition that more matches an actual travel scene.

In one or more embodiments of the present invention, the difficulty in recognizing a feature is determined on the basis of the acceleration or deceleration of the subject vehicle. This allows a determination to be made whether an avoidance location is set or not after the calculation of the recognition degree which may vary due to the acceleration or deceleration. Thus, even a location that may be set as an avoidance location in a normal travel can be excluded from the avoidance locations, provided that the acceleration or deceleration is possible at that location. The location excluded from the avoidance locations can be included in the travel route.

DESCRIPTION OF REFERENCE NUMERALS

1 Vehicle information detection unit
2 Travel route calculation unit
3 Information acquisition unit
4 Distance measurement unit
5 Recognition determination unit
6 Recognition degree calculation unit
7 Avoidance location setting unit
8 Vehicle speed estimation unit

The invention claimed is:
1. A travel route calculation device for autonomous travel comprising:
   a processor and a database storing map information and object information on objects and features, the processor configured to:
      calculate a travel route for a subject vehicle to arrive at a destination;

acquire object information on an object from the database, the object affecting recognition of a feature by the subject vehicle, the feature being located ahead of the subject vehicle on the travel route and representing a traffic rule that the subject vehicle must follow when traveling on the travel route;

calculate a necessary recognition distance from the subject vehicle to the feature; calculate an index of recognizability of the feature as a recognition degree on the basis of the object information and the necessary recognition distance;

determine a difficulty in recognizing the feature as a recognition result, on a basis of the object information and the necessary recognition distance; determine that recognition of the feature is difficult when the recognition degree is lower than a predetermined threshold;

calculate the travel route while avoiding a location at which recognition of the feature is determined to be the difficulty;

recognize information concerning the feature;

decide an action for an autonomous drive on a basis of the recognized information; and execute autonomous drive control on a basis of the action decided, wherein the necessary recognition distance is a distance necessary for the processor to recognize the object information when deciding the action for the autonomous drive.

2. The travel route calculation device according to claim 1, wherein the processor is configured to acquire information on a road shape and positional information of the feature included in the object information, and specify a position of the feature on a layout of a road on a basis of the information on the road shape and the positional information of the feature; and determine the difficulty in recognizing the feature, on a basis of the location and the necessary recognition distance.

3. The travel route calculation device according to claim 1, wherein the processor is further configured to:

estimate a vehicle speed of the subject vehicle; and calculate the necessary recognition distance on a basis of the vehicle speed.

4. The travel route calculation device according to claim 3, wherein the processor is configured to estimate a legal speed of the travel route as the vehicle speed.

5. The travel route calculation device according to claim 3, wherein the processor is configured to estimate the vehicle speed when traveling on a certain road of the travel route on a basis of the vehicle speed when having traveled on the certain road in a past time.

6. The travel route calculation device according to claim 1, wherein the processor is configured to:

acquire information on a road shape included in the object information and information on the feature included in the object information;

specify a point having the road shape which causes a change in behavior of the subject vehicle, or a point having the feature which causes a change in behavior of the subject vehicle; and determine the difficulty at the specified point.

7. The travel route calculation device according to claim 6, wherein the processor is configured to specify a point at which behavior of the subject vehicle and behavior of another vehicle interfere with each other as the specified point for determining the difficulty.

8. The travel route calculation device according to claim 6, wherein the processor is configured to specify a point having the feature which indicates the traffic rule as the specified point for determining the difficulty.

9. The travel route calculation device according to claim 1, wherein the processor is configured to calculate the necessary recognition distance on a basis of behavior of the subject vehicle.

10. The travel route calculation device according to claim 1, wherein the processor is configured to determine the difficulty in recognizing the feature on a basis of an obstacle located around the feature.

11. The travel route calculation device according to claim 1, wherein the processor is configured to:

acquire information on a road shape included in the object information; and determine the difficulty in recognizing the feature, on a basis of a curvature of a road or a gradient of a road represented by the information on the road.

12. The travel route calculation device according to claim 1, wherein the processor is further configured to:

detect the feature; and determine the difficulty in recognizing the feature on a basis of a detection range of the feature detection unit.

13. The travel route calculation device according to claim 1, wherein the processor is configured to determine the difficulty in recognizing the feature, on a basis of acceleration or deceleration of the subject vehicle traveling toward the feature.

14. A travel route calculation device for autonomous travel comprising:

a processor and a database storing map information and object information on objects and features, the processor configured to:

calculate a travel route for a subject vehicle to arrive at a destination;

acquire from the database information on an object, the object affecting recognition of a feature by the subject vehicle, the feature being located ahead of the subject vehicle on the travel route and representing a traffic rule that the subject vehicle must follow when traveling on the travel route;

calculate a necessary recognition distance from the subject vehicle to the feature;

calculate an index of recognizability of the feature as a recognition degree on a basis of the object information and the necessary recognition distance; calculate the travel route while avoiding a location at which recognition of the feature is determined to be difficult;

recognize the information concerning the feature on the travel route;

decide the action for an autonomous drive on a basis of the recognized information, and perform autonomous drive control on a basis of the action decided calculate recognition degrees on each of a plurality of travel routes at each location of the feature on the travel routes; and calculate a calculated travel route on which the subject vehicle travels, out of the plurality of travel routes, wherein the necessary recognition distance is a distance necessary for the processor to recognize the object information when deciding the action of the autonomous drive, and the calculated travel route is a travel route on which a sum of the recognition degrees is highest or a travel route on which a number of the recognition degrees higher than a predetermined value is largest.

* * * * *